(12) United States Patent
Parri et al.

(10) Patent No.: US 10,190,049 B2
(45) Date of Patent: Jan. 29, 2019

(54) MESOGENIC MEDIA AND LIQUID CRYSTAL DISPLAY

(71) Applicant: MERCK PATENT GMBH, Darmstadt (DE)

(72) Inventors: Owain Ilyr Parri, Ringwood (GB); Graziano Archetti, Darmstadt (DE); Simon Siemianowski, Darmstadt (DE); Izumi Saito, Darmstadt (DE); Rachel Tuffin, Chandlers Ford (GB)

(73) Assignee: MERCK PATENT GMBH, Darmstadt (DE)

( * ) Notice: Subject to any disclaimer, the term of this patent is extended or adjusted under 35 U.S.C. 154(b) by 13 days.

(21) Appl. No.: 15/325,258

(22) PCT Filed: Jun. 15, 2015

(86) PCT No.: PCT/EP2015/001200
§ 371 (c)(1),
(2) Date: Jan. 10, 2017

(87) PCT Pub. No.: WO2016/005021
PCT Pub. Date: Jan. 14, 2016

(65) Prior Publication Data
US 2017/0190971 A1   Jul. 6, 2017

(30) Foreign Application Priority Data
Jul. 11, 2014   (EP) ..................................... 14002387

(51) Int. Cl.
*G02F 1/1333*   (2006.01)
*C09K 19/34*   (2006.01)
*C09K 19/02*   (2006.01)
*C09K 19/58*   (2006.01)
C09K 19/04   (2006.01)

(52) U.S. Cl.
CPC ...... *C09K 19/3444* (2013.01); *C09K 19/0258* (2013.01); *C09K 19/3483* (2013.01); *C09K 19/3486* (2013.01); *C09K 19/586* (2013.01); *C09K 19/588* (2013.01); C09K 2019/0444 (2013.01)

(58) Field of Classification Search
CPC ............ C09K 19/3444; C09K 19/0258; C09K 19/3483; C09K 19/3486; C09K 19/586; C09K 19/588; C09K 2019/0444; G02F 1/1333
USPC ..................................................... 252/299.66
See application file for complete search history.

(56) References Cited

U.S. PATENT DOCUMENTS

| 2013/0182202 | A1 | 7/2013 | Graziano et al. |
| 2015/0175886 | A1 | 6/2015 | Tuffin et al. |
| 2016/0060530 | A1* | 3/2016 | Archetti ................. C09K 19/54 349/20 |

FOREIGN PATENT DOCUMENTS

| DE | 102011108708 A1 | 3/2012 |
| WO | 2013174481 A1 | 11/2013 |

OTHER PUBLICATIONS

International Search Report for PCT/EP2015/001200 dated Sep. 30, 2015.

* cited by examiner

*Primary Examiner* — Geraldina Visconti
(74) *Attorney, Agent, or Firm* — Millen White Zelano and Branigan, PC; John Sopp

(57) ABSTRACT

The invention relates to mesogenic media comprising one or more bimesogenic compounds, one or more nematogenic compound, one or more chiral compound and a compound of formula I, $$R^{11}\text{-}A^{11}\text{-}(Z^{12}\text{-}A^{12})_m\text{-}AG \qquad \text{I}$$

in which, the parameter $A^{11}$, $A^{12}$, $Z^{12}$ and $R^{11}$ have one of the meanings as given in claim 1, and to the use of these mesogenic media in liquid crystal devices and in particular in flexoelectric liquid crystal devices, as well as to liquid crystal devices comprising a liquid crystal medium according to the present invention.

9 Claims, No Drawings

MESOGENIC MEDIA AND LIQUID CRYSTAL DISPLAY

The invention relates to mesogenic media comprising one or more bimesogenic compounds, one or more nematogenic compound, one or more chiral compound and a compound of formula I, $$R^{11}\text{-}A^{11}\text{-}(Z^{12}\text{-}A^{12})_m\text{-}AG \qquad I,$$

in which, $A^{11}$ and $A^{12}$ each, independently of one another, denote an aryl-, heteroaryl-, heterocyclic- or alicyclic group optionally being substituted by one or more identical or different groups L, L in each case, independently of one another, denotes, halogen, —CN, —NO$_2$, —NCO, —NCS, —OCN, —SCN, straight-chain or branched alkyl or alkoxy having 1 to 5 C atoms, where, in addition, one or more non-terminal CH$_2$ groups in these radicals may each be replaced, independently of one another, by —C≡C—, —CF$_2$O—, —CH=CH—,

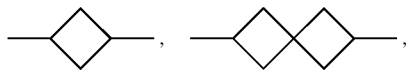

—O—, —CO—O—, —O—CO— in such a way that O atoms are not linked directly to one another, and in which, in addition, one or more H atoms may be replaced by halogen, $Z^{12}$ in each case, independently of one another, denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^{01}$=CY$^{02}$—, —C≡C—, —CH=CH—COO—, —OCO—CH=CH—, or a single bond, preferably —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond, $Y^{01}$ and $Y^{02}$ each, independently of one another, denote H, F, Cl or CN.

$R^0$ and $R^{00}$ each, independently of one another, denote H or alkyl having 1 to 12 C atoms, $R^{11}$ denotes an alkyl or alkoxy radical having 1 to 15 C atoms, where, in addition, one or more non-terminal CH$_2$ groups in these radicals may each be replaced, independently of one another, by —C≡C—, —CF$_2$O—, —CH=CH—,

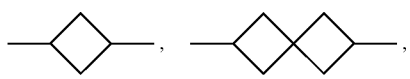

—O—, —CO—O—, —O—CO— in such a way that O atoms are not linked directly to one another, and in which, in addition, one or more H atoms may be replaced by halogen, AG denotes -Sp-X$^{11}$ Sp denotes —(CH$_2$)$_p$—, p denotes 0, 1 or 2, X$^{11}$ denotes a group —NH$_2$, —SH, —OH, —(CO)OH or a group of the formulae

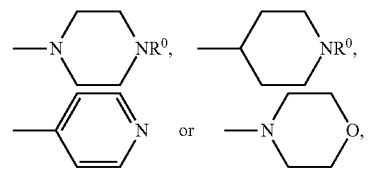

and m denotes 0, 1 or 2, to the use of these mesogenic media in electro-optical devices, in particular in flexoelectric liquid crystal devices, as well as to electro-optical devices comprising a liquid crystal medium according to the present invention.

Liquid Crystal Displays (LCDs) are widely used to display information. LCDs are used for direct view displays, as well as for projection type displays. The electro-optical mode, which is employed for most displays, still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, as e. g. the vertically aligned nematic (VAN), the patterned ITO vertically aligned nematic (PVA)-, the polymer stabilized vertically aligned nematic (PSVA)-mode and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multimedia applications and thus are competing with the TN-LCDs.

Further to these displays, new display modes using cholesteric liquid crystals having a relatively short cholesteric pitch have been proposed for use in displays exploiting the so-called "flexoelectric" effect.

Flexoelectric liquid crystal materials are known in prior art.

The flexoelectric effect is described inter alia by Chandrasekhar, "Liquid Crystals", 2nd edition, Cambridge University Press (1992) and P. G. deGennes et al., "The Physics of Liquid Crystals", 2nd edition, Oxford Science Publications (1995).

In these displays, the cholesteric liquid crystals are oriented in the "uniformly lying helix" arrangement (ULH), which also give this display mode its name. For this purpose, a chiral substance, which is mixed with a nematic material, induces a helical twist transforming the material into a chiral nematic material, which is equivalent to a cholesteric material.

The uniform lying helix texture is realized using a chiral nematic liquid crystal with a short pitch, typically in the range from 0.2 µm to 1 µm, preferably of 1.0 µm or less, in particular of 0.5 µm or less, which is unidirectional aligned with its helical axis parallel to the substrates, e. g. glass plates, of a liquid crystal cell. In this configuration, the helical axis of the chiral nematic liquid crystal is equivalent to the optical axis of a birefringent plate.

If an electrical field is applied to this configuration normal to the helical axis, the optical axis is rotated in the plane of the cell, similar as the director of a ferroelectric liquid crystal rotate as in a surface stabilized ferroelectric liquid crystal display. The flexoelectric effect is characterized by fast response times typically ranging from 500 µs to 3 ms. It further features excellent grey scale capability.

The field induces a splay bend structure in the director, which is accommodated by a tilt in the optical axis. The angle of the rotation of the axis is in first approximation directly and linearly proportional to the strength of the electrical field. The optical effect is best seen when the liquid crystal cell is placed between crossed polarizers with the optical axis in the unpowered state at an angle of 22.5° to the absorption axis of one of the polarizers. This angle of 22.5° is also the ideal angle of rotation of the electric field, as thus, by the inversion the electrical field, the optical axis is rotated by 45° and by appropriate selection of the relative orientations of the preferred direction of the axis of the helix, the absorption axis of the polarizer and the direction of the electric field, the optical axis can be switched from parallel to one polarizer to the center angle between both polarizers. The optimum contrast is then achieved when the total angle of the switching of the optical axis is 45°. In that case, the arrangement can be used as a switchable quarter wave plate, provided the optical retardation, i.e. the product of the effective birefringence of the liquid crystal and the cell gap, is selected to be the quarter of the wavelength. In this context, the wavelength referred to is 550 nm, the wavelength for which the sensitivity of the human eye is highest, unless explicitly stated otherwise.

The angle of rotation of the optical axis ($\Phi$) is given in good approximation by formula (1)

$$\tan \Phi = \bar{e} P_0 E / (2\pi K) \quad (1)$$

wherein
$P_0$ is the undisturbed pitch of the cholesteric liquid crystal,
$\bar{e}$ is the average [$\bar{e}=\frac{1}{2}(e_{splay}+e_{bend})$] of the splay flexoelectric coefficient ($e_{splay}$) and the bend flexoelectric coefficient ($e_{bend}$),
E is the electrical field strength and
K is the average [$K=\frac{1}{2}(k_{11}+k_{33})$] of the splay elastic constant ($k_{11}$) and the bend elastic constant ($K_{33}$)
and wherein
$\bar{e}/K$ is called the flexo-elastic ratio.

This angle of rotation is half the switching angle in a flexoelectric switching element.

The response time ($\tau$) of this electro-optical effect is given in good approximation by formula (2)

$$\tau = [P_0/(2\pi)]^0 \gamma/K \quad (2)$$

wherein
$\gamma$ is the effective viscosity coefficient associated with the distortion of the helix.

There is a critical field ($E_c$) to unwind the helix, which can be obtained from equation (3)

$$E_c = (\pi^2/P_0) \cdot [k_{22}/(\epsilon_0 \cdot \Delta\epsilon)]^{1/2} \quad (3)$$

wherein
$k_{22}$ is the twist elastic constant,
$\epsilon_0$ is the permittivity of vacuum and
$\Delta\epsilon$ is the dielectric anisotropy of the liquid crystal.

In this mode, however several problems still have to be resolved, which are, amongst others, an unfavorably high voltage required for addressing, which is incompatible with common driving electronics, a not really dark "off state", which deteriorates the contrast, and, last not least, a pronounced hysteresis in the electro-optical characteristics.

The main obstacle preventing the mass production of a ULH display is that its alignment is intrinsically unstable; no single surface treatment (planar, homeotropic or tilted) provides an energetically stable state. Due to this obtaining a high quality dark state is difficult as a large amount of defects are present when conventional cells are used.

Various attempts to improve ULH alignment mostly involving polymer structures on surfaces or bulk polymer networks, such as, for example described in, Appl. Phys. Lett. 2010, 96, 113503 *"Periodic anchoring condition for alignment of a short pitch cholesteric liquid crystal in uniform lying helix texture"*;
Appl. Phys. Lett. 2009, 95, 011102, *"Short pitch cholesteric electro-optical device based on periodic polymer structures"*;
J. Appl. Phys. 2006, 99, 023511, *"Effect of polymer concentration on stabilized large-tilt-angle flexoelectro-optic switching"*;
J. Appl. Phys. 1999, 86, 7, *"Alignment of cholesteric liquid crystals using periodic anchoring"*;
Jap. J. Appl. Phys. 2009, 48, 101302, *"Alignment of the Uniform Lying Helix Structure in Cholesteric Liquid Crystals"* or US 2005/0162585 A1. However, all attempts require another unfavorable processing step.

An alternative flexoelectric-optic mode, the USH mode, is proposed by Coles et al in WO2006/003441, and in SID2009 (F. Castles, S. M. Morris, and H. J. Coles, *SID 09 DIGEST,* 2009, 582) as well as in Coles et al 2011 (D. J. Gardiner, S. M. Morris, F. Castles, M. M. Qasim, W. S. Kim, S S. Choi, H. J. Park, I. J. Chung, H. J. Coles, *Applied Physics Letter,* 2011, 98, 263508). The material requirements for both ULH and USH are similar. Recently, the Coles group published a paper on the structure-property relationship for dimeric liquid crystals. Coles et al., 2012 (*Physical Review E* 2012, 85, 012701).

The so-called uniformly standing helix (USH) mode, may be considered as an alternative mode to succeed the IPS, as it can show improved black levels, even compared to other display mode providing wide viewing angles (e.g. IPS, VA etc.).

For the USH mode, like for the ULH mode, flexoelectric switching has been proposed, using bimesogenic liquid crystal materials.

Bimesogenic compounds are known in general from prior art (cf. also Hori, K., Limuro, M., Nakao, A., Toriumi, H., J. Mol. Struc. 2004, 699, 23-29).

However, due to the unfavorably high driving voltage required, to the relatively narrow phase range of the chiral nematic materials and to their irreversible switching properties, materials from prior art are not compatible for the use with current LCD driving schemes.

For displays of the USH and ULH mode, new liquid crystalline media with improved properties are required. Especially the birefringence ($\Delta n$) should be optimized for the optical mode.

Furthermore, for displays utilizing the USH or ULH mode the optical retardation d*$\Delta n$ (effective) of the liquid crystal media should preferably be such that the equation (4)

$$\sin 2(\pi \cdot d \cdot \Delta n / \lambda) = 1 \quad (4)$$

wherein d is the cell gap and

λ is the wavelength of light is satisfied. The allowance of deviation for the right hand side of equation (7) is +/−3%.

The wavelength of light generally referred to in this application is 550 nm, unless explicitly specified otherwise.

The cell gap of the cells preferably is in the range from 1 μm to 20 μm, in particular within the range from 2.0 μm to 10 μm.

For the ULH/USH mode, the dielectric anisotropy (Δ∈) should be as small as possible, to prevent unwinding of the helix upon application of the addressing voltage. Preferably Δ∈ should be slightly higher than 0 and very preferably be 0.1 or more, but preferably 10 or less, more preferably 7 or less and most preferably 5 or less.

Besides the above-mentioned parameters, the media have to exhibit a suitably wide range of the nematic phase, a rather small rotational viscosity and an at least moderately high specific resistivity.

Similar liquid crystal compositions with short cholesteric pitch for flexoelectric devices are known from EP 0 971 016, GB 2 356 629 and Coles, H. J., Musgrave, B., Coles, M. J., and Willmott, J., J. Mater. Chem., 11, p. 2709-2716 (2001). EP 0 971 016 reports on mesogenic estradiols, which, as such, have a high flexoelectric coefficient.

GB 2 356 629 suggests the use of bimesogenic compounds in flexoelectric devices. The flexoelectric effect herein has been investigated in pure cholesteric liquid crystal compounds and in mixtures of homologous compounds only so far. Most of these compounds were used in binary mixtures consisting of a chiral additive and a nematic liquid crystal material being either a simple, conventional monomesogenic material or a bimesogenic one. These materials do have several drawbacks for practical applications, like insufficiently wide temperature ranges of the chiral nematic—or cholesteric phase, too small flexoelectric ratios, small angles of rotation.

Symmetrical dimeric compounds showing liquid crystalline behaviour are disclosed in Joo-Hoon Park et al. "Liquid Crystalline Properties of Dimers Having o-, m- and p-Positional Molecular structures", Bill. Korean Chem. Soc., 2012, Vol. 33, No. 5, pp. 1647-1652.

However, there is still room for improvement and it can be summarized that there is a considerable demand for improved flexoelectric devices and alternative liquid crystal materials having favorable properties.

Thus, one aim of the invention is to provide improved flexoelectric devices, which do not have the drawbacks of the prior art materials and have the advantages mentioned above and below. These advantages are amongst others favourable high switching angles, favorable fast response times, favorable low voltage required for addressing, compatible with common driving electronics, and a favorable really dark "off state", which not deteriorates the contrast.

Another aim of the invention is to extend the pool liquid crystal materials with advantageous properties, in particular for use in flexoelectric displays that are available to the expert, which enable a good uniform alignment over the entire area of the display cell without the use of a mechanical shearing process, show a good contrast, high switching angles and fast response times also at low temperatures. Furthermore, the liquid crystal materials should exhibit at the same time low melting points, broad chiral nematic phase ranges, short temperature independent pitch lengths and high flexoelectric coefficients.

Other aims of the present invention are immediately evident to the person skilled in the art from the following detailed description.

Surprisingly, the inventors have found out that one or more of the above-defined aims can be achieved by providing a mesogenic media comprising one or more bimesogenic compounds, one or more nematogenic compound, one or more chiral compound and a compound of formula I according to the present invention.

In particular, by utilizing the compounds of formula I in the liquid crystalline media according to the present invention, the alignment of the liquid crystal material in the cell is significantly improved and finally results in an improved dark "off" state, whilst exhibiting at the same time low melting points, broad chiral nematic phase ranges, short temperature independent pitch lengths and high flexoelectric coefficients.

Terms and Definitions

The term "liquid crystal", "mesomorphic compound", or "mesogenic compound" (also shortly referred to as "mesogen") means a compound that under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

The term "mesogenic group" means in this context, a group with the ability to induce liquid crystal (LC) phase behaviour. The compounds comprising mesogenic groups do not necessarily have to exhibit an LC phase themselves. It is also possible that they show LC phase behaviour only in mixtures with other compounds. For the sake of simplicity, the term "liquid crystal" is used hereinafter for both mesogenic and LC materials.

Throughout the application, the term "aryl and heteroaryl groups" encompass groups, which can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, more preferably 1,4-phenylene, 4,4'-biphenylene, 1, 4-tephenylene.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxa-zole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenan-throline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

In the context of this application, the term "(non-aromatic) alicyclic and heterocyclic groups" encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydro-naphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyr-rolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydro-cyclopenta[a]phenanthrene, optionally being substituted by one or more identical or different groups L, Especially preferred aryl-, heteroaryl-, alicyclic- and heterocyclic groups are 1,4-phenylene, 4,4'-biphenylene, 1,4-terphenylene, 1,4-cyclohexylene, 4,4'-bicyclohexylene, and 3,17-hexadecahydro-cyclopenta[a]phenanthrene, optionally being substituted by one or more identical or different groups L.

Preferred substituents (L) of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile. Particularly preferred substituents are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$.

Above and below "halogen" denotes F, Cl, Br or I.

Above and below, the terms "alkyl", "aryl", "heteroaryl", etc., also encompass polyvalent groups, for example alkylene, arylene, heteroarylene, etc. The term "aryl" denotes an aromatic carbon group or a group derived there from. The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluorohexyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pen-tynyl, hexynyl, octynyl.

Preferred amino groups are, for example, dimethylamino, methylamino, methylphenylamino, phenylamino.

The term "chiral" in general is used to describe an object that is non-superimposable on its mirror image. "Achiral" (non-chiral) objects are objects that are identical to their mirror image. The terms chiral nematic and cholesteric are used synonymously in this application, unless explicitly stated otherwise. The pitch induced by the chiral substance ($P_0$) is in a first approximation inversely proportional to the concentration (c) of the chiral material used. The constant of proportionality of this relation is called the helical twisting power (HTP) of the chiral substance and defined by equation (5)

$$HTP \equiv 1/(c \cdot P_0) \qquad (5)$$

wherein
c is concentration of the chiral compound.

The term "bimesogenic compound" relates to compounds comprising two mesogenic groups in the molecule. Just like normal mesogens, they can form many mesophases, depending on their structure. In particular, bimesogenic compound may induce a second nematic phase, when added to a nematic liquid crystal medium. Bimesogenic compounds are also known as "dimeric liquid crystals".

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a large proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a large proportion of the liquid-crystalline molecules are oriented at an angle θ ("tilt angle") between about 80° to 90° relative to the plane of the layer.

The birefringence Δn herein is defined in equation (6)

$$\Delta n = n_e - n_o \quad (6)$$

wherein $n_e$ is the extraordinary refractive index and $n_o$ is the ordinary refractive index, and the average refractive index $n_{av.}$ is given by the following equation (7).

$$n_{av.} = [(2n_o^2 + n_e^2)/3]^{1/2} \quad (7)$$

The extraordinary refractive index $n_e$ and the ordinary refractive index $n_o$ can be measured using an Abbe refractometer. An can then be calculated from equation (6).

In the present application the term "dielectrically positive" is used for compounds or components with Δ∈>3.0, "dielectrically neutral" with −1.5≤Δ∈≤3.0 and "dielectrically negative" with Δ∈<−1.5. Δ∈ is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10 its concentration is reduced by a factor of 2 until the resultant medium is stable enough at least to allow the determination of its properties. Preferably, the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

Δ∈ is defined as (∈∥−∈⊥), whereas $\in_{av.}$ is (∈∥+2∈⊥)/3.

The dielectric permittivity of the compounds is determined from the change of the respective values of a host medium upon addition of the compounds of interest. The values are extrapolated to a concentration of the compounds of interest of 100%. The host mixture is disclosed in H. J. Coles et al., J. Appl. Phys. 2006, 99, 034104 and has the composition given in the table 1.

TABLE 1

Host mixture composition

| Compound | Concentration |
|---|---|
| F-PGI-ZI-9-ZGP-F | 25% |
| F-PGI-ZI-11-ZGP-F | 25% |
| FPGI-O-5-O-PP-N | 9.5% |
| FPGI-O-7-O-PP-N | 39% |
| CD-1 | 1.5% |

Furthermore, the definitions as given in C. Tschierske, G. Pelzl and S. Diele, Angew. Chem. 2004, 116, 6340-6368 shall apply to non-defined terms related to liquid crystal materials in the instant application.

DETAILED DESCRIPTION

In a preferred embodiment of the present invention, the compounds of formula I are selected from the group of compounds wherein the anchor group AG in formula I denotes —NH₂, —SH, —OH or —(CO)OH.

More preferably, the compounds of formula I are selected from the group of compounds of the following formulae,

Ia

Ib

Ic

Id in which, the groups $R^{11}$, $A^{11}$, $A^{12}$, $Z^{12}$, Sp and parameter m have one of the meanings as indicated under formula I.

Even more preferred are the compounds of formula I selected from the group of compounds in which m denotes 0.

Accordingly, preferred compounds are the compounds of formula I selected from formulae Ia and Ic, such as

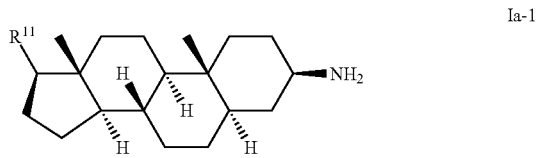

Ia-1

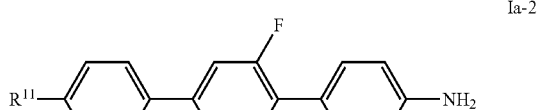

Ia-2

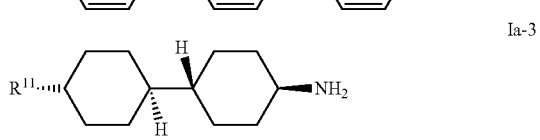

Ia-3

Ia-4

Ia-5

Ia-6

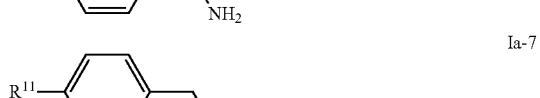

Ia-7

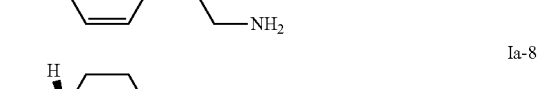

Ia-8

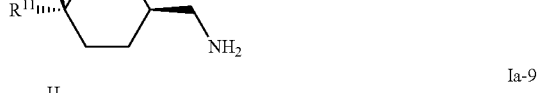

Ia-9

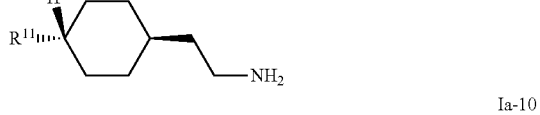

Ia-10

-continued

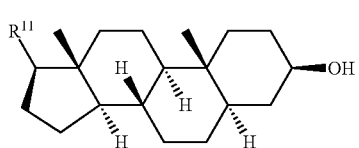 Ic-1

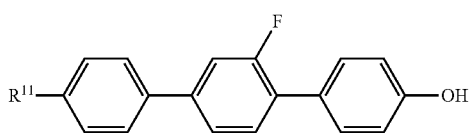 Ic-2

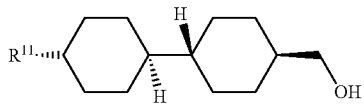 Ic-3

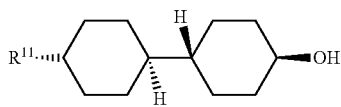 Ic-4

 Ic-5

 Ic-6

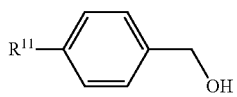 Ic-7

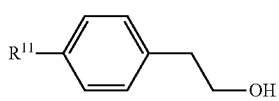 Ic-8

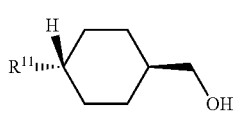 Ic-9

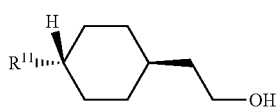 Ic-10

 Ic-11 in which $R^{11}$ is a straight chain or branched alkyl, having 1 to 25 C atoms.

Especially preferred are the compounds wherein no group Sp is present, such as the compounds of formulae Ia-1 to Ia-5, Ia-10, Ic-1 to Ic-6 and Ic-11, and in particular the compounds of formulae Ic-3, Ic-4, Ic-5 and Ic-6, most preferably the compounds of formula Ic-3.

The compounds of formula I are either known to the expert and can be synthesized according to or in analogy to methods which are known per se and which are described in standard works of organic chemistry such as, for example, Houben-Weyl, Methoden der organischen Chemie, Thieme-Verlag, Stuttgart.

Typically, the total concentration of compounds of formula I range from approximately 0.01 to approximately 10% by weight, preferably from approximately 0.01 to approximately 5% by weight, and more preferably from approximately 0.01 to approximately 3% by weight.

Preferably, the bimesogenic compounds are selected from the group of compounds of formulae A-I to A-III,

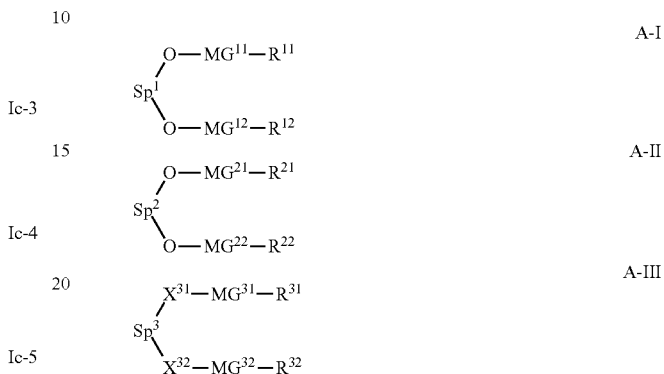

wherein $R^{11}$ and $R^{12}$, $R^{21}$ and $R^{22}$, and $R^{31}$ and $R^{32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent CH$_2$ groups to be replaced, in each occurrence independently from one another, by —O—, —S—, —NH—, —N(CH$_3$)—, —CO—, —COO—, —OCO—, —O—CO—O—, —S—CO—, —CO—S—, —CH═CH—, —CH═CF—, —CF═CF— or —C≡C— in such a manner that oxygen atoms are not linked directly to one another, MG$^{11}$ and MG$^{12}$, MG$^{21}$ and MG$^{22}$, and MG$^{31}$ and MG$^{32}$ are each independently a mesogenic group, Sp$^1$, Sp$^2$ and Sp$^3$ are each independently a spacer group comprising 5 to 40 C atoms, wherein one or more non-adjacent CH$_2$ groups, with the exception of the CH$_2$ groups of Sp$^1$ linked to O-MG$^{11}$ and/or O-MG$^{12}$, of Sp$^2$ linked to MG$^{21}$ and/or MG$^{22}$ and of Sp$^3$ linked to X$^{31}$ and X$^{32}$, may also be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH═CH— or —C≡C—, however in such a way that no two O-atoms are adjacent to one another, no two —CH═CH— groups are adjacent to each other, and no two groups selected from —O—CO—, —S—CO—, —O—COO—, —CO—S—, —CO—O— and —CH═CH— are adjacent to each other and X$^{31}$ and X$^{32}$ are independently from one another a linking group selected from —CO—O—, —O—CO—, —CH═CH—, —C≡C— or —S—, and, alternatively, one of them may also be either —O— or a single bond, and, again alternatively, one of them may be —O— and the other one a single bond, Preferably used are compounds of formulae A-I to A-III
wherein
$Sp^1$, $Sp^2$ and $Sp^3$ are each independently —$(CH_2)_n$— with n an integer from 1 to 15, most preferably an uneven integer, wherein one or more —$CH_2$— groups may be replaced by —CO—.

Especially preferably used are compounds of formula A-III wherein
—$X^{31}$—$Sp^3$-$X^{32}$— is -$Sp^3$-O—, -$Sp^3$-CO—O—, -$Sp^3$-O—CO—, —O-$Sp^3$-, —O-$Sp^3$-CO—O—, —O-$Sp^3$-O—CO—, —O—CO-$Sp^3$-O—, —O—CO-$Sp^3$-O—CO—, —CO—O-$Sp^3$-O— or —CO—O-$Sp^3$-CO—O—, however under the condition that in —$X^{31}$-$Sp^3$-$X^{32}$— no two O-atoms are adjacent to one another, no two —CH=CH— groups are adjacent to each other and no two groups selected from —O—CO—, —S—CO—, —O—COO—, —CO—S—, —CO—O— and —CH=CH— are adjacent to each other.

Preferably used are compounds of formula A-I in which $MG^{11}$ and $MG^{12}$ are independently from one another -$A^{11}$-$(Z^1$-$A^{12})_m$-
wherein
$Z^1$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond,
$A^{11}$ and $A^{12}$ are each independently in each occurrence 1,4-phenylene, wherein in addition one or more CH groups may be replaced by N, trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1] decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and
m is 0, 1, 2 or 3.

Preferably used are compounds of formula A-II in which $MG^{21}$ and $MG^{22}$ are independently from one another -$A^{21}$-$(Z^2$-$A^{22})_m$-
wherein
$Z^2$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond,
$A^{21}$ and $A^{22}$ are each independently in each occurrence 1,4-phenylene, wherein in addition one or more CH groups may be replaced by N, trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1] decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and
m is 0, 1, 2 or 3.

Most preferably used are compounds of formula A-III in which
$MG^{31}$ and $MG^{32}$ are independently from one another -$A^{31}$-$(Z^3$-$A^{32})_m$-
wherein
$Z^3$ is —COO—, —OCO—, —O—CO—O—, —$OCH_2$—, —$CH_2O$—, —$CH_2CH_2$—, —$(CH_2)_4$—, —$CF_2CF_2$—, —CH=CH—, —CF=CF—, —CH=CH—COO—, —OCO—CH=CH—, —C≡C— or a single bond,
$A^{31}$ and $A^{32}$ are each independently in each occurrence 1,4-phenylene, wherein in addition one or more CH groups may be replaced by N, trans-1,4-cyclo-hexylene in which, in addition, one or two non-adjacent $CH_2$ groups may be replaced by O and/or S, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutane-1,3-diyl, spiro[3.3]heptane-2,6-diyl or dispiro[3.1.3.1] decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl, and
m is 0, 1, 2 or 3.

Preferably, the compounds of formula A-III are asymmetric compounds, preferably having different mesogenic groups $MG^{31}$ and $MG^{32}$.

Generally preferred are compounds of formulae A-I to A-III in which the dipoles of the ester groups present in the mesogenic groups are all oriented in the same direction, i.e. all —CO—O— or all —O—CO—.

Especially preferred are compounds of formulae A-I and/or A-II and/or A-III wherein the respective pairs of mesogenic groups ($MG^{11}$ and $MG^{12}$) and ($MG^{21}$ and $MG^{22}$) and ($MG^{31}$ and $MG^{32}$) at each occurrence independently from each other comprise one, two or three six-atomic rings, preferably two or three six-atomic rings.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being preferably F, Cl, CN, OH, $NO_2$ or an optionally fluorinated alkyl, alkoxy or alkanoyl group with 1 to 7 C atoms, very preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, in particular F, Cl, CN, $CH_3$, $C_2H_5$, $OCH_3$, $COCH_3$ and $OCF_3$, most preferably F, Cl, $CH_3$, $OCH_3$ and $COCH_3$ and Cyc is 1,4-cyclohexylene. This list comprises the sub-formulae shown below as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |

-Phe-Z-Cyc-Z-Cyc- II-11
-Cyc-Z-Cyc-Z-Cyc- II-12
-Phe-Z-Phe-Z-PheL- II-13
-Phe-Z-PheL-Z-Phe- II-14
-PheL-Z-Phe-Z-Phe- II-15
-PheL-Z-Phe-Z-PheL- II-16
-PheL-Z-PheL-Z-Phe- II-17
-PheL-Z-PheL-Z-PheL- II-18
-Phe-Z-PheL-Z-Cyc- II-19
-Phe-Z-Cyc-Z-PheL- II-20
-Cyc-Z-Phe-Z-PheL- II-21
-PheL-Z-Cyc-Z-PheL- II-22
-PheL-Z-PheL-Z-Cyc- II-23
-PheL-Z-Cyc-Z-Cyc- II-24
-Cyc-Z-PheL-Z-Cyc- II-25

Particularly preferred are the sub formulae II-1, II-4, II-6, II-7, II-13, II-14, II-15, II-16, II-17 and II-18.

In these preferred groups, Z in each case independently has one of the meanings of $Z^1$ as given in formula II. Preferably Z is —COO—, —OCO—, —CH$_2$CH$_2$—, —C≡C— or a single bond, especially preferred is a single bond.

Very preferably the mesogenic groups $MG^{11}$ and $MG^{12}$, $MG^{21}$ and $MG^{22}$ and $MG^{31}$ and $MG^{32}$ are each and independently selected from the following formulae and their mirror images Very preferably, at least one of the respective pairs of mesogenic groups $MG^{11}$ and $MG^{12}$, $MG^{21}$ and $MG^{22}$ and $MG^{31}$ and $MG^{32}$ is, and preferably, both of them are each and independently, selected from the following formulae IIa to IIn (the two reference Nos. "II i" and "II l" being deliberately omitted to avoid any confusion) and their mirror images

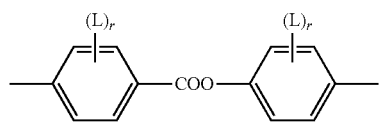

IIa

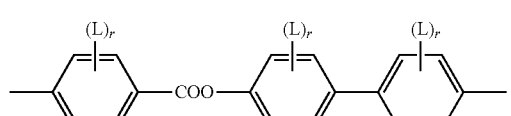

IIb

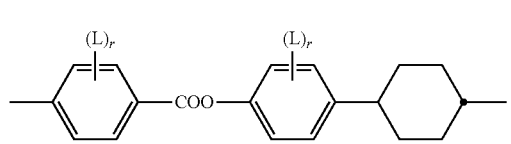

IIc

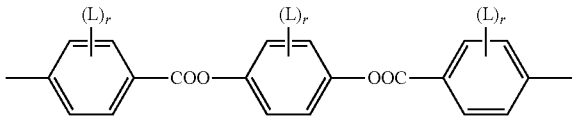

IId

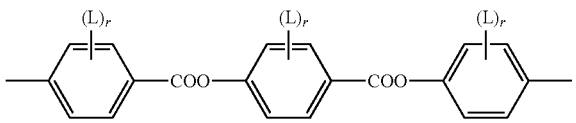

IIe

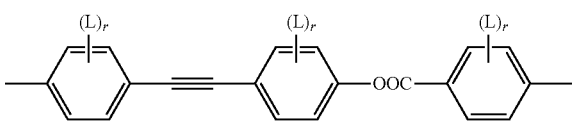

IIf

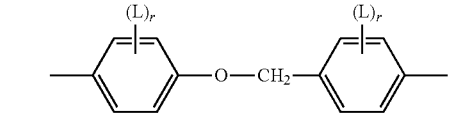

IIg

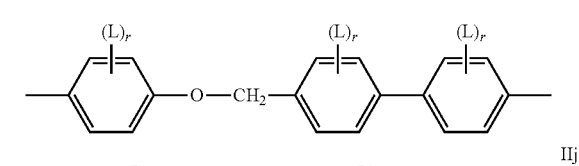

IIh

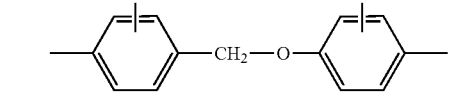

IIj

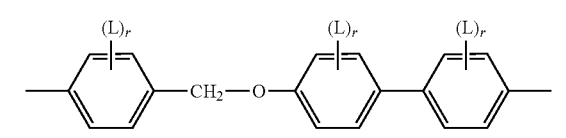

IIk

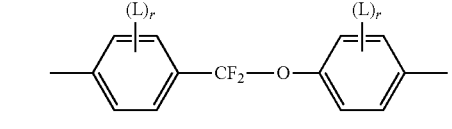

IIm

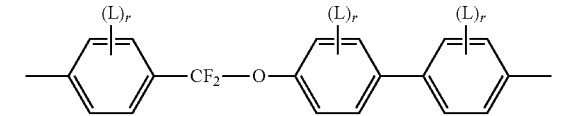

IIn wherein

L is in each occurrence independently of each other F or Cl, preferably F and r is in each occurrence independently of each other 0, 1, 2 or 3, preferably 0, 1 or 2.

The group

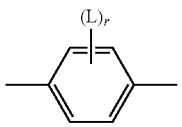

in these preferred formulae is very preferably denoting

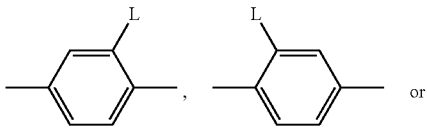

furthermore

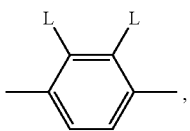

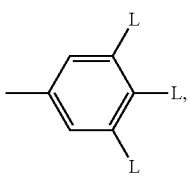

Particularly preferred are the sub formulae IIa, IId, IIg, IIh, IIi, IIk and IIo, in particular the sub formulae IIa and IIg.

In case of compounds with a non-polar group, $R^{11}$, $R^{12}$, $R^{21}$, $R^{22}$, $R^{31}$, and $R^{32}$ are preferably alkyl with up to 15 C atoms or alkoxy with 2 to 15 C atoms.

If $R^{11}$ and $R^{12}$, $R^{21}$ and $R^{22}$ and $R^{31}$ and $R^{32}$ are an alkyl or alkoxy radical, i.e. where the terminal $CH_2$ group is replaced by —O—, this may be straight chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In case of a compounds with a terminal polar group, $R^{11}$ and $R^{12}$, $R^{21}$ and $R^{22}$ and $R^{31}$ and $R^{32}$ are selected from CN, $NO_2$, halogen, $OCH_3$, OCN, SCN, $COR^X$, $COOR^X$ or a mono-oligo- or polyfluorinated alkyl or alkoxy group with 1 to 4 C atoms. $R^X$ is optionally fluorinated alkyl with 1 to 4, preferably 1 to 3 C atoms. Halogen is preferably F or Cl.

Especially preferably $R^{11}$ and $R^{12}$, $R^{21}$ and $R^{22}$ and $R^{31}$ and $R^{32}$ in formulae A-I, A-II, respectively A-III are selected of H, F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of H, F, Cl, CN, $OCH_3$ and $OCF_3$, especially of H, F, CN and $OCF_3$.

In addition, compounds of formulae A-I, A-II, respectively A-III containing an achiral branched group $R^{11}$ and/or $R^{21}$ and/or $R^{31}$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The spacer groups $Sp^1$, $Sp^2$ and $Sp^3$ are preferably a linear or branched alkylene group having 5 to 40 C atoms, in particular 5 to 25 C atoms, very preferably 5 to 15 C atoms, in which, in addition, one or more non-adjacent and non-terminal $CH_2$ groups may be replaced by —O—, —S—, —NH—, —N($CH_3$)—, —CO—, —O—CO—, —O—COO—, —CO—S—, —CH(halogen)-, —CH(CN)—, —CH=CH— or "Terminal" $CH_2$ groups are those directly bonded to the mesogenic groups. Accordingly, "non-terminal" $CH_2$ groups are not directly bonded to the mesogenic groups $R^{11}$ and $R^{12}$, $R^{21}$ and $R^{22}$ and $R^{31}$ and $R^{32}$.

Typical spacer groups are for example —$(CH_2)_o$—, —$(CH_2CH_2O)_p$—$CH_2CH_2$—, with o being an integer from 5 to 40, in particular from 5 to 25, very preferably from 5 to 15, and p being an integer from 1 to 8, in particular 1, 2, 3 or 4.

Preferred spacer groups are pentylene, hexylene, heptylene, octylene, nonylene, decylene, undecylene, dodecylene, octadecylene, diethyleneoxyethylene, dimethyleneoxybutylene, pentenylene, heptenylene, nonenylene and undecenylene, for example.

Especially preferred are compounds of formulae A-I, A-II and A-III wherein $Sp^1$, $Sp^2$, respectively $Sp^3$ are alkylene with 5 to 15 C atoms. Straight-chain alkylene groups are especially preferred.

Preferred are spacer groups with even numbers of a straight-chain alkylene having 6, 8, 10, 12 and 14 C atoms.

In another embodiment of the present invention are the spacer groups preferably with odd numbers of a straight-chain alkylene having 5, 7, 9, 11, 13 and 15 C atoms. Very preferred are straight-chain alkylene spacers having 5, 7, or 9 C atoms.

Especially preferred are compounds of formulae A-I, A-II and A-III wherein $Sp^1$, $Sp^2$, respectively $Sp^3$ are completely deuterated alkylene with 5 to 15 C atoms. Very preferred are deuterated straight-chain alkylene groups. Most preferred are partially deuterated straight-chain alkylene groups.

Preferred are compounds of formula A-I wherein the mesogenic groups $R^{11}$-$MG^{11}$- and $R^{12}$-$MG^1$- are different. Especially preferred are compounds of formula A-I wherein $R^{11}$-$MG^{11}$- and $R^{12}$-$MG^{12}$- in formula A-I are identical.

Preferred compounds of formula A-I are selected from the group of compounds of formulae A-I-1 to A-I-3

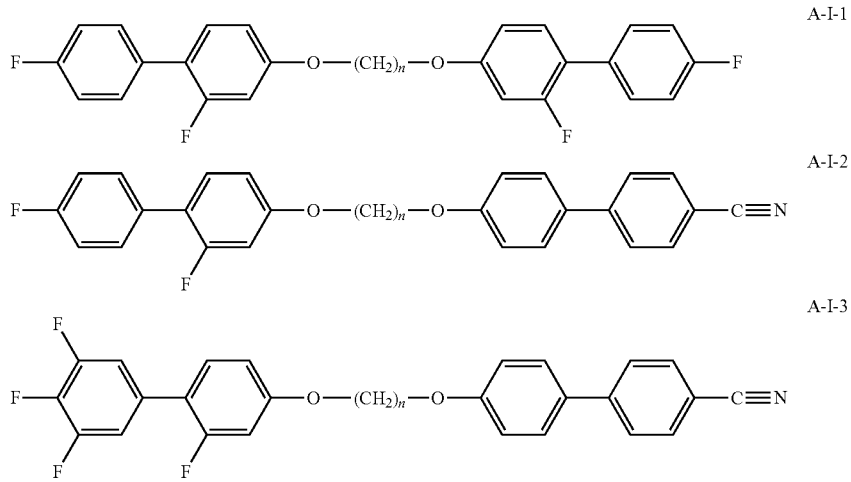

wherein the parameter n has the meaning given above and preferably is 3, 5, 7 or 9, more preferably 5, 7 or 9.

Preferred compounds of formula A-II are selected from the group of compounds of formulae A-II-1 to A-II-4

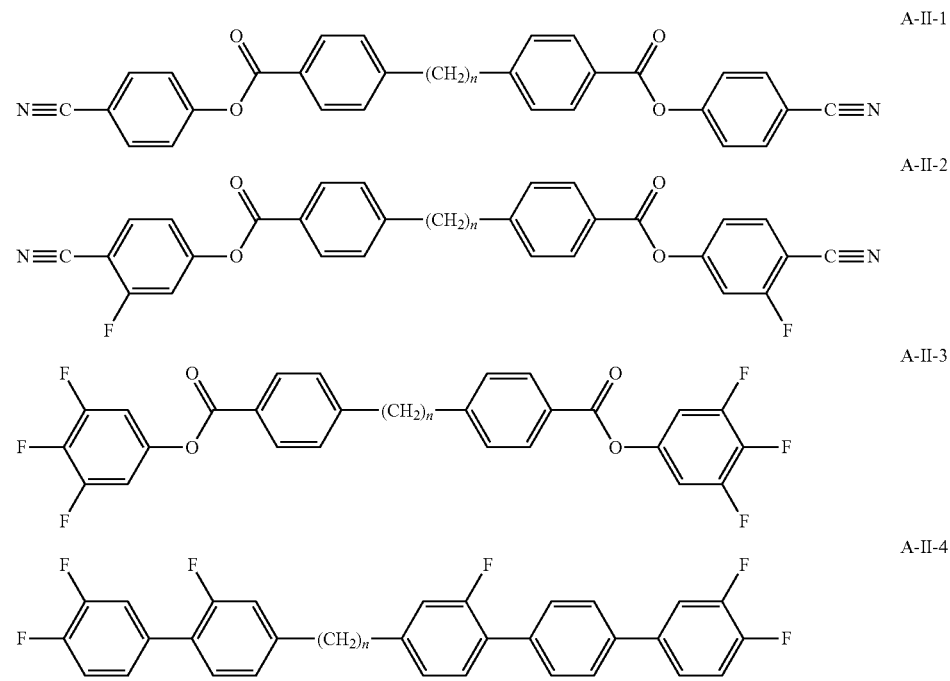

wherein the parameter n has the meaning given above and preferably is 3, 5, 7 or 9, more preferably 5, 7 or 9.

Preferred compounds of formula A-III are selected from the group of compounds of formulae A-III-1 to A-III-11

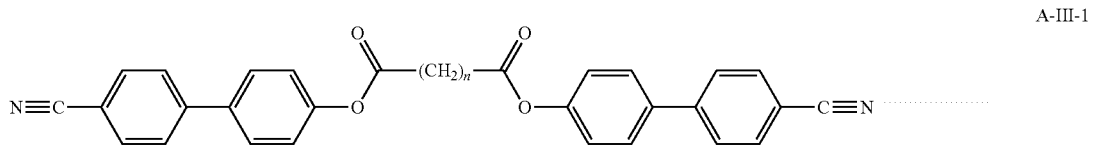

-continued
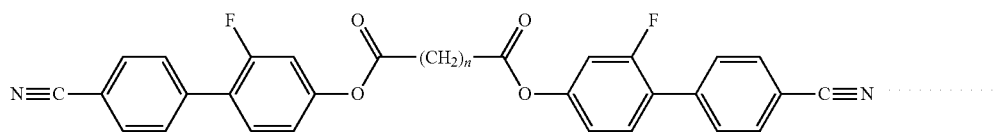
A-III-2
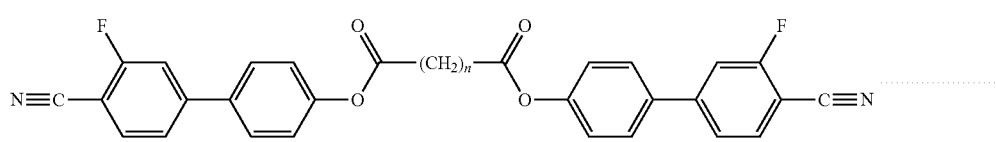
A-III-3
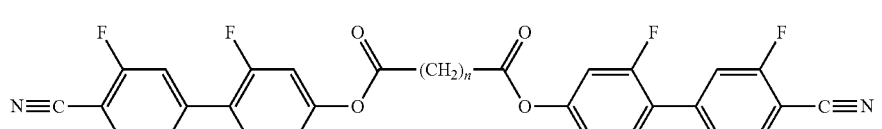
A-III-4
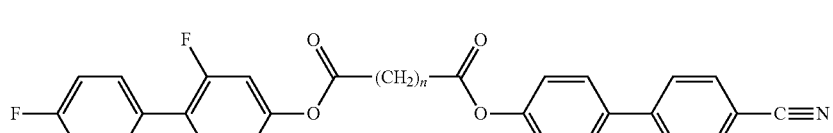
A-III-5
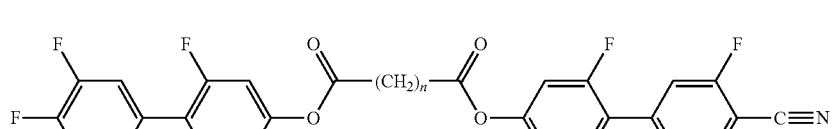
A-III-6
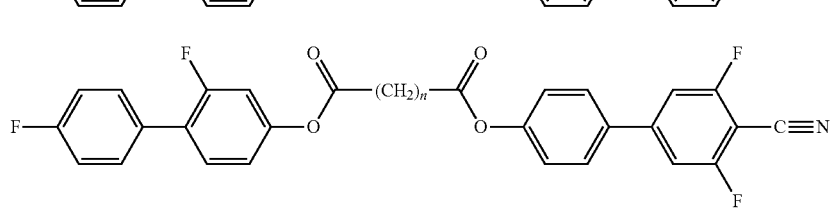
A-III-7
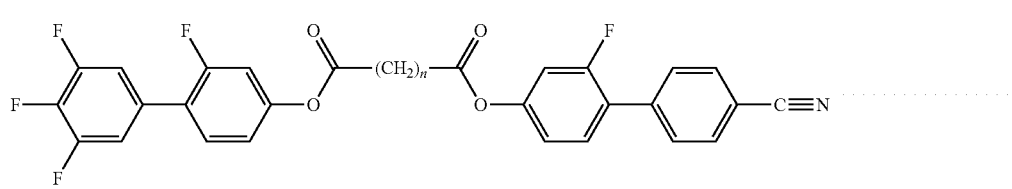
A-III-8
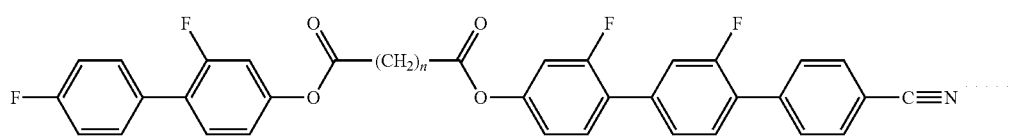
A-III-9
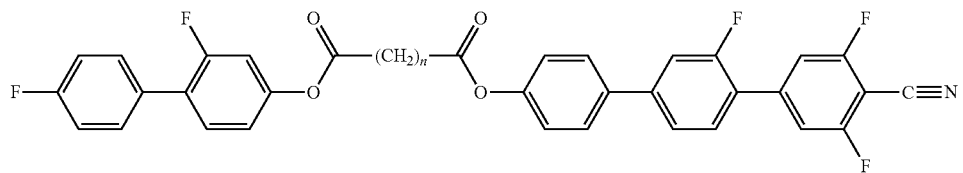
A-III-10
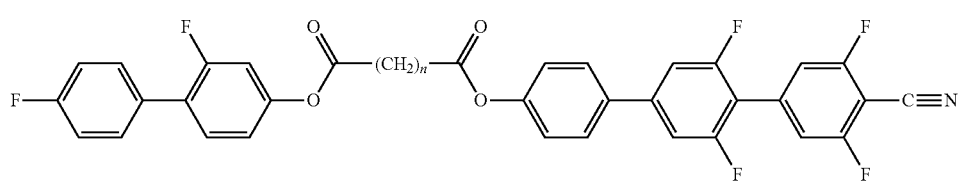
A-III-11

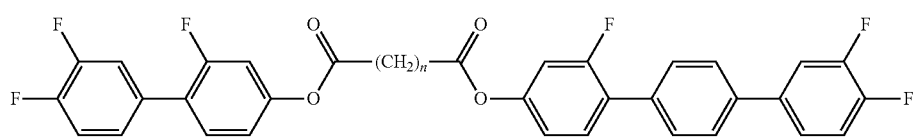
A-III-12
wherein the parameter n has the meaning given above and preferably is 3, 5, 7 or 9, more preferably 5, 7 or 9.
Particularly preferred exemplary compounds of formulae A-I are the following compounds:
symmetrical ones:
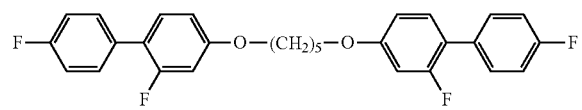
-continued
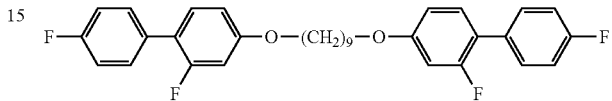
and non-symmetrical ones:
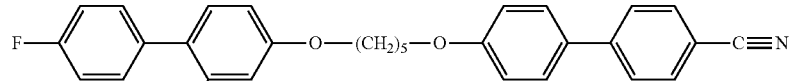
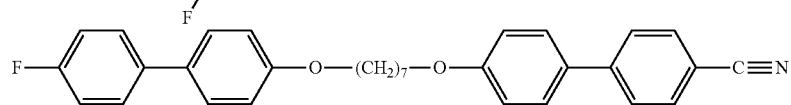
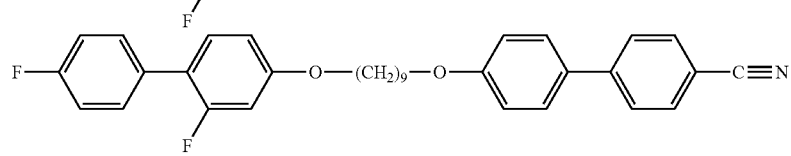
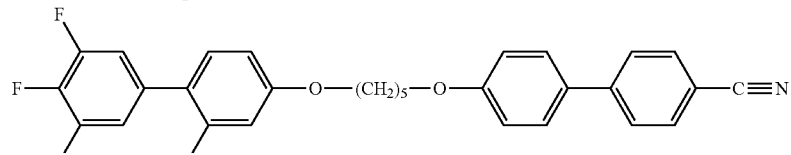
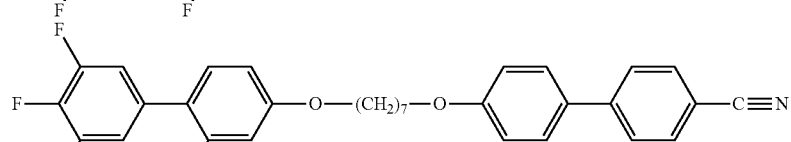
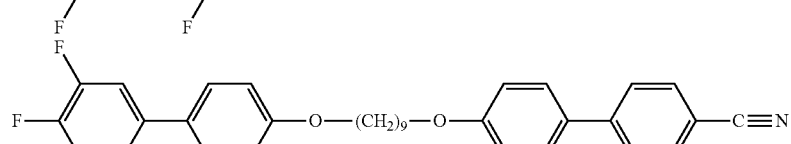
Particularly preferred exemplary compounds of formulae A-II are the following compounds:
symmetrical ones:
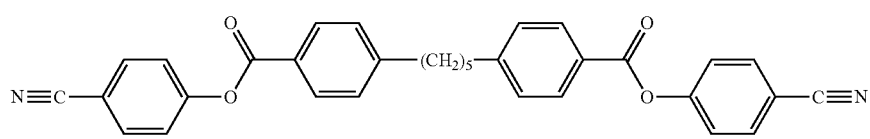

-continued
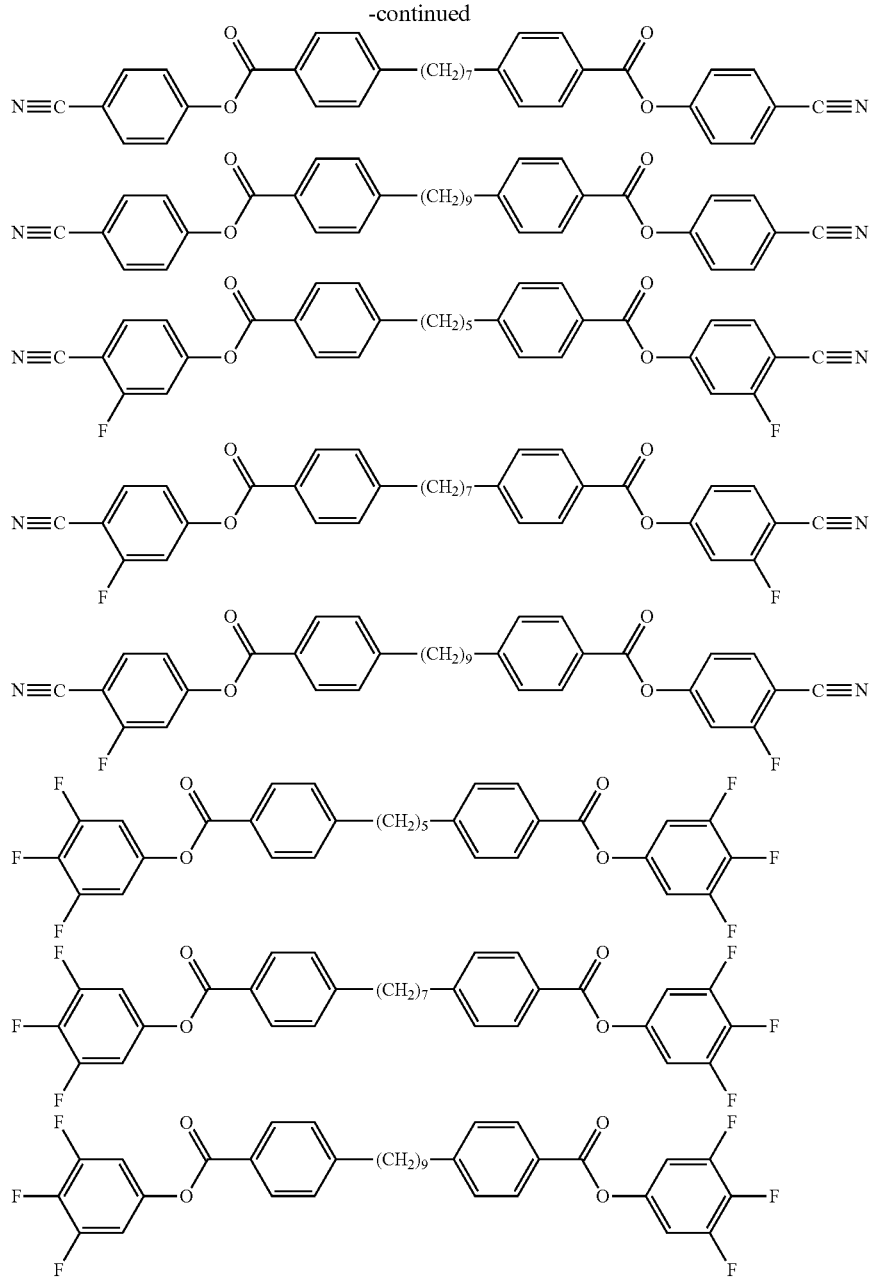
and non-symmetrical ones:
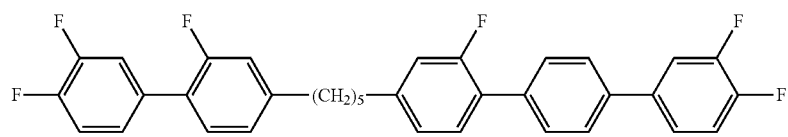
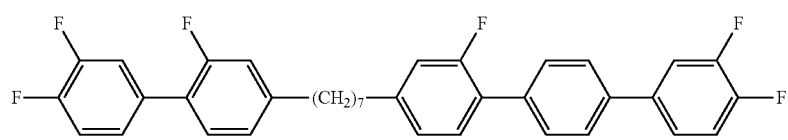

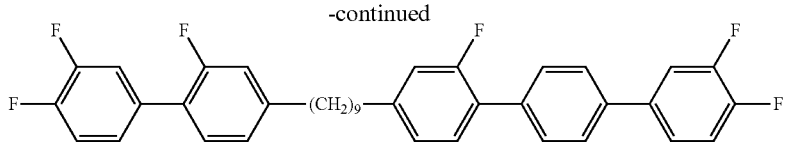
Particularly preferred exemplary compounds of formulae A-III are the following compounds:
symmetrical ones:
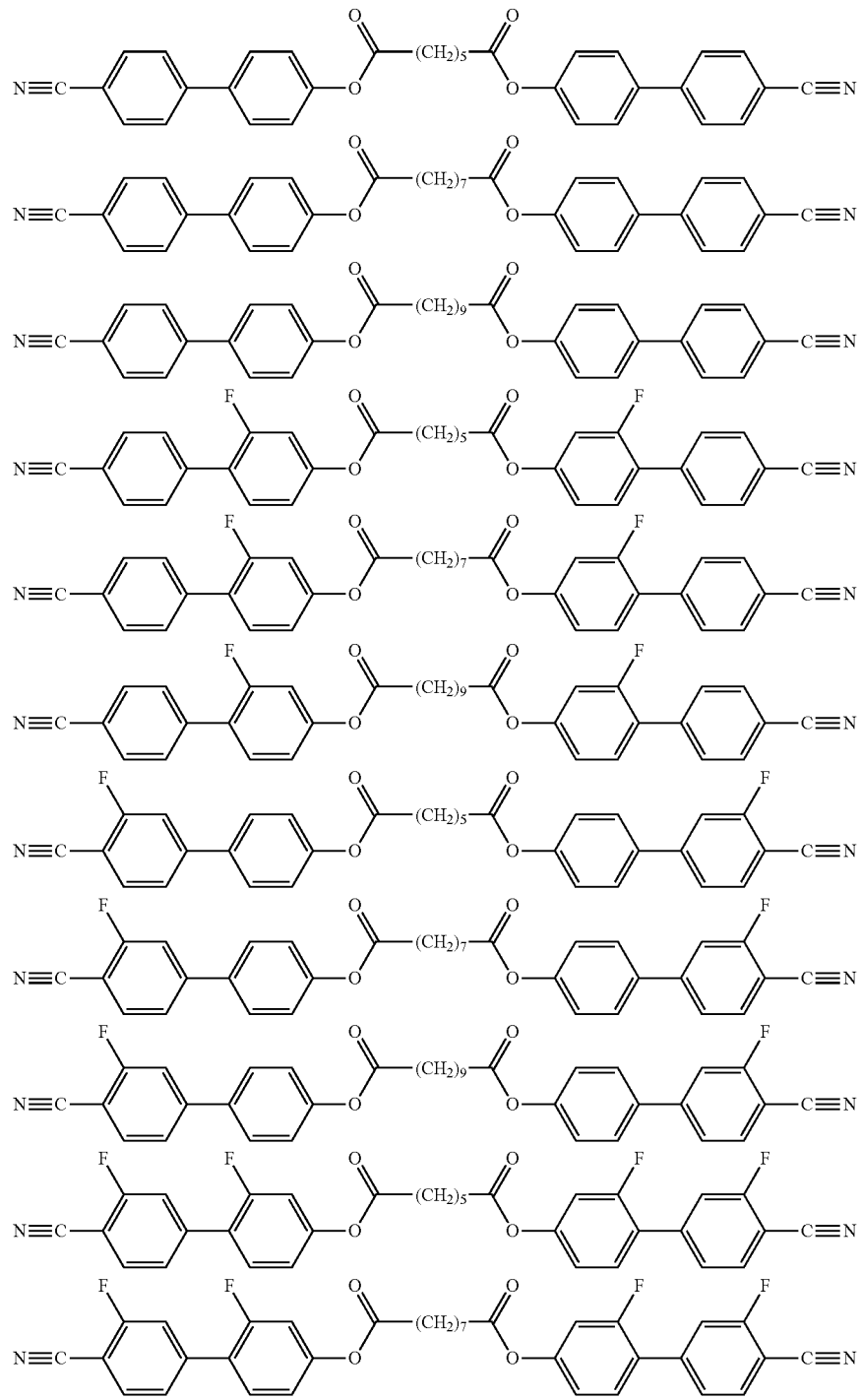

-continued
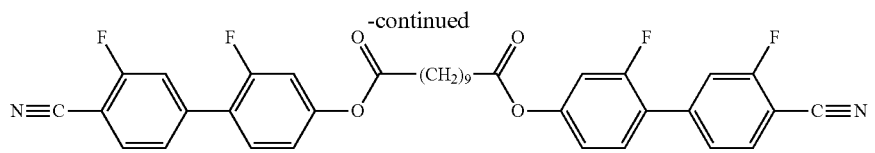
and non-symmetrical ones:
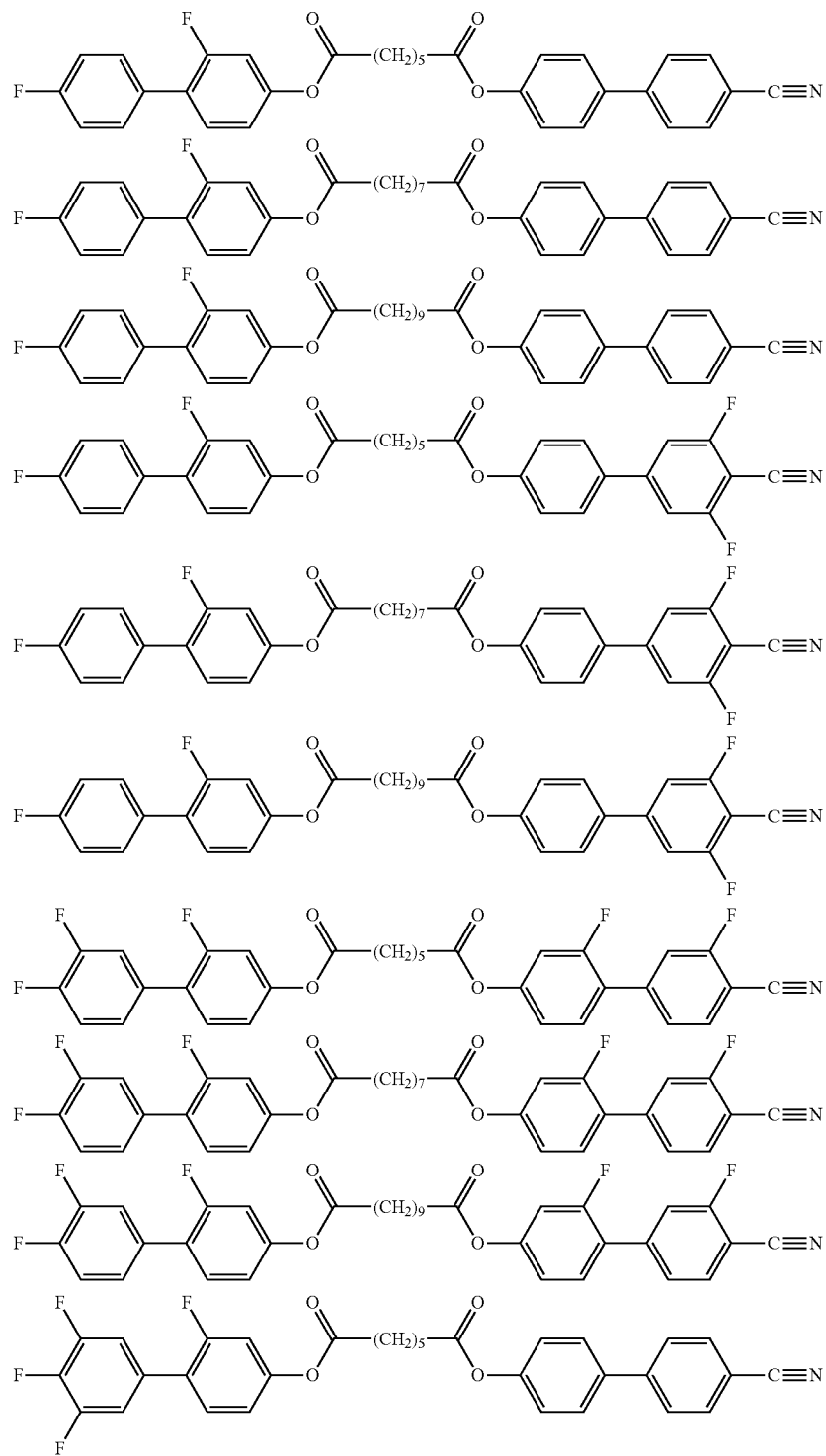

-continued
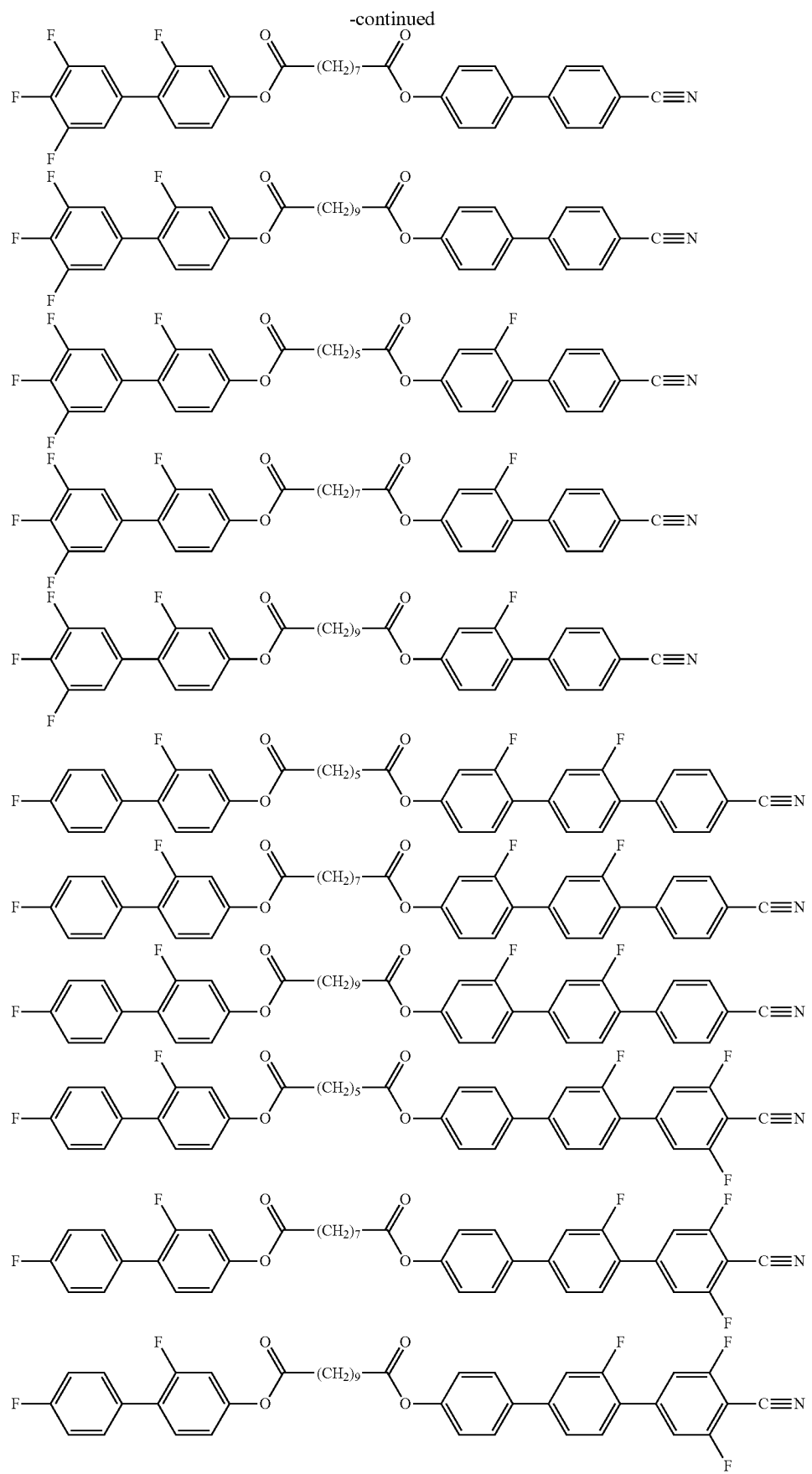

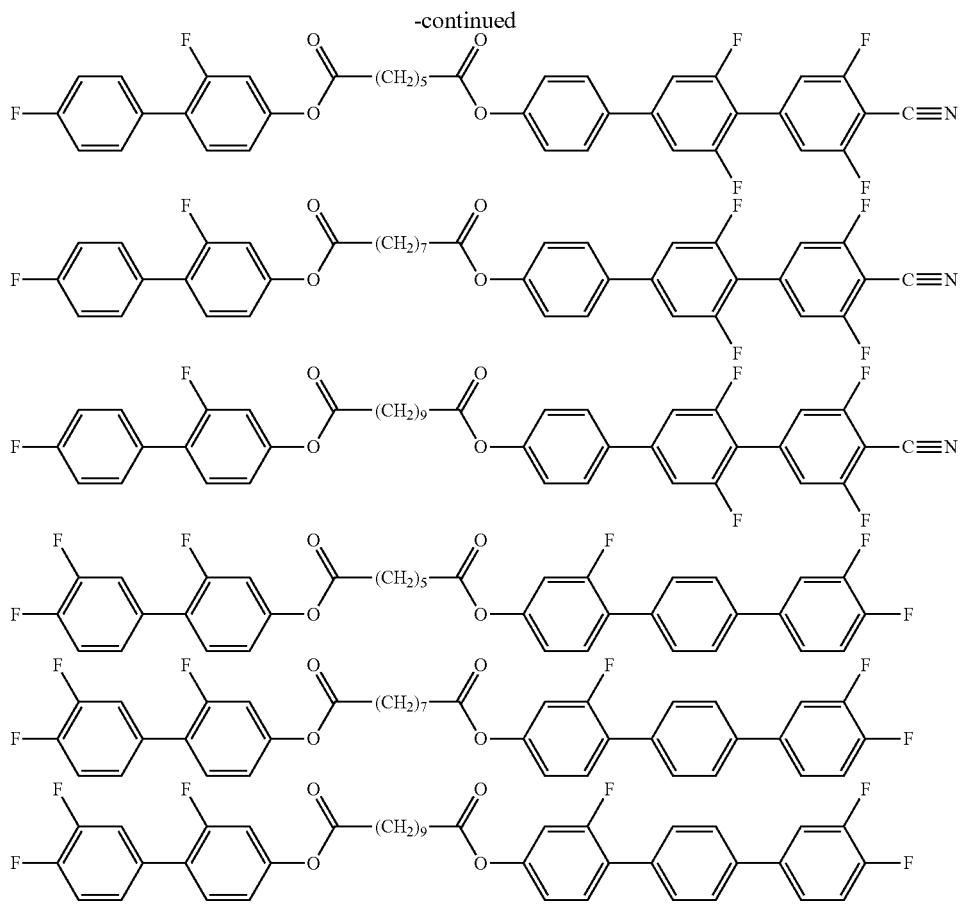

The compounds of formulae A-I to A-III can be synthesized according to or in analogy to methods which are known per se and which are described in standard works of organic chemistry such as, for example, Houben-Weyl, Methoden der organischen Chemie, Thieme-Verlag, Stuttgart.

Compounds of formula A-II, when added to a nematic liquid crystalline mixture, produce a phase below the nematic. In this context, a first indication of the influence of bimesogenic compounds on nematic liquid crystal mixtures was reported by Barnes, P. J., Douglas, A. G., Heeks, S. K., Luckhurst, G. R., Liquid Crystals, 1993, Vol. 13, No. 4, 603-613. This reference exemplifies highly polar alkyl spacered dimers and perceives a phase below the nematic, concluding it is a type of smectic.

A photo evidence of an existing mesophase below the nematic phase was published by Henderson, P. A., Niemeyer, O., Imrie, C. T. in Liquid Crystals, 2001, Vol. 28, No. 3, 463-472, which was not further investigated.

In Liquid Crystals, 2005, Vol. 32, No. 11-12, 1499-1513 Henderson, P. A., Seddon, J. M. and Imrie, C. T. reported, that the new phase below the nematic belonged in some special examples to a smectic C phase. An additional nematic phase below the first nematic was reported by Panov, V. P., Ngaraj, M., Vij, J. K., Panarin, Y. P., Kohlmeier, A., Tamba, M. G., Lewis, R. A. and Mehl, G. H. in Phys. Rev. Lett. 2010, 105, 1678011-1678014.

In this context, liquid crystal mixtures comprising the new and inventive bimesogenic compounds of formulae A-I and/or A-II and/or A-III show also a novel mesophase that is being assigned as a second nematic phase. This mesophase exists at a lower temperature than the original nematic liquid crystalline phase and has been observed in the unique mixture concepts presented by this application.

Accordingly, the bimesogenic compounds of formula A-II according to the present invention allow the second nematic phase to be induced in nematic mixtures that do not have this phase normally. Furthermore, varying the amounts of compounds of formula A-II allow the phase behaviour of the second nematic to be tailored to the required temperature.

In a preferred embodiment, the nematogenic compounds are preferably selected from the group of compounds of formulae B-I to B-III

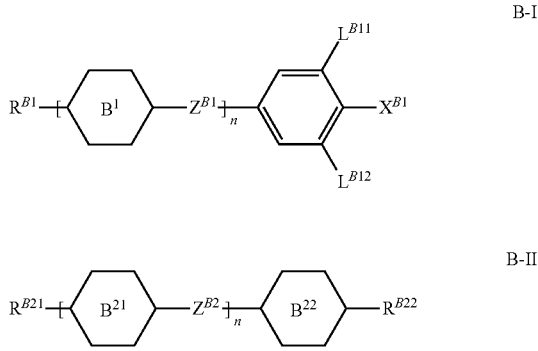

-continued

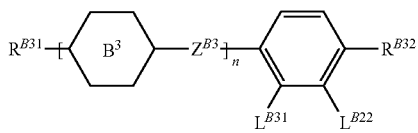
B-III wherein
$R^{B1}$, $R^{B21}$ and $R^{B22}$ and $R^{B31}$ and $R^{B32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent $CH_2$ groups to be replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another,
$X^{B1}$ is F, Cl, CN, NCS, preferably CN,
$Z^{B1}$, $Z^{B2}$ and $Z^{B3}$ are in each occurrence independently —CH$_2$—CH$_2$—, —CO—O—, —O—CO—, —CF$_2$—O—, —O—CF$_2$—, —CH=CH— or a single bond, preferably —CH$_2$—CH$_2$—, —CO—O—, —CH=CH— or a single bond, more preferably —CH$_2$—CH$_2$— or a single bond, even more preferably one of the groups present in one compound is —CH$_2$—CH$_2$— and the others are a single bond, most preferably all are a single bond,

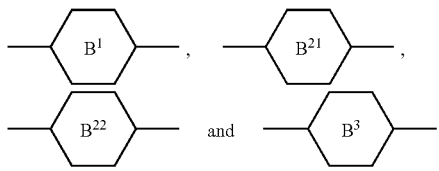

are in each occurrence independently

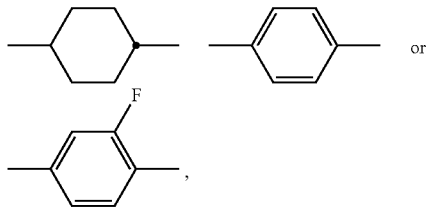

preferably

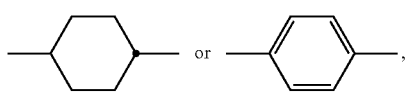

most preferably

alternatively one or more of

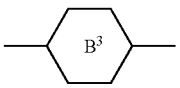

are

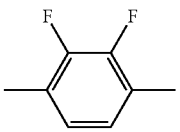

and
n is 1, 2 or 3, preferably 1 or 2.

Further preferred are liquid crystalline media comprising one or more nematogens of formula B-I selected from the from the group of formulae B-I-1 to B-I-, preferably of formula B-I-2 and/or B-I-4, most preferably B-I-4

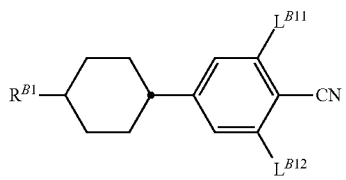
B-I-1

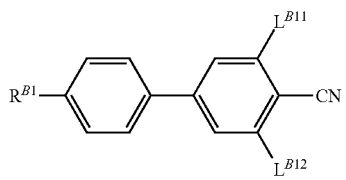
B-I-2

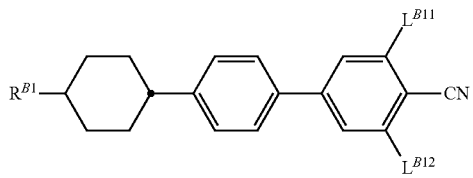
B-I-3

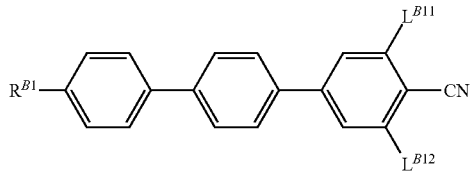
B-I-4 wherein the parameters have the meanings given above and preferably
$R^{B1}$ is alkyl, alkoxy, alkenyl or alkenyloxy with up to 12 C atoms, and
$L^{B1}$ and $L^{B1}$ are independently H or F, preferably one is H and the other H or F and most preferably both are H.

Further preferred are liquid crystalline media comprising one or more nematogens of formula B-II selected from the from the group of formulae B-II-1 and B-II-2, preferably of formula B-II-2 and/or B-II-4, most preferably of formula B-II-1

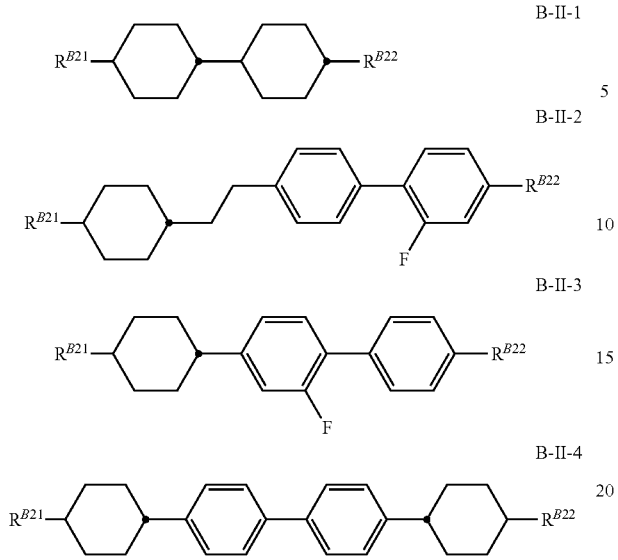

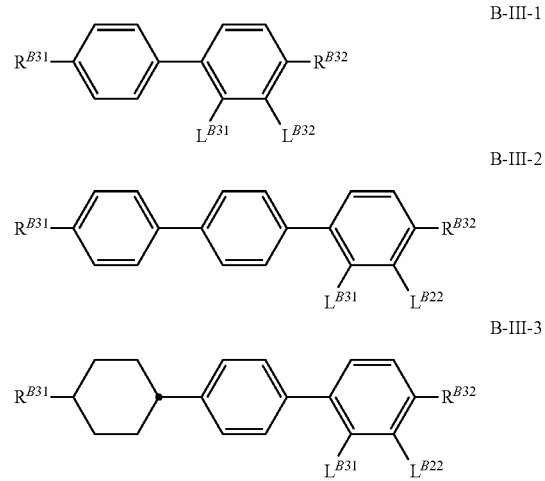

wherein the parameters have the meanings given above and preferably $R^{B21}$ and $R^{B22}$ are independently alkyl, alkoxy, alkenyl or alkenyloxy with up to 12 C atoms, more preferably $R^{B21}$ is alkyl and $R^{B22}$ is alkyl, alkoxy or alkenyl and in formula B-II-1 most preferably alkenyl, in particular vinyl or 1-propenyl, and in formula B-II-2, most preferably alkyl.

Further preferred are liquid crystalline media comprising one or more nematogens of formula B-III, preferably selected from the group compounds of formulae B-III-1 to B-III-3 wherein the parameters have the meanings given above and preferably $R^{B31}$ and $R^{B32}$ are independently alkyl, alkoxy, alkenyl or alkenyloxy with up to 12 C atoms, more preferably $R^{B31}$ is alkyl and $R^{B32}$ is alkyl or alkoxy and most preferably alkoxy, and $L^{B31}$ and $L^{B32}$ are independently H or F, preferably one is F and the other H or F and most preferably both are F.

The compounds of formulae B-I to B-III are either known to the expert and can be synthesized according to or in analogy to methods which are known per se and which are described in standard works of organic chemistry such as, for example, Houben-Weyl, Methoden der organischen Chemie, Thieme-Verlag, Stuttgart.

The chiral compounds are preferably selected from the group of compounds of formulae C-I to C-III,

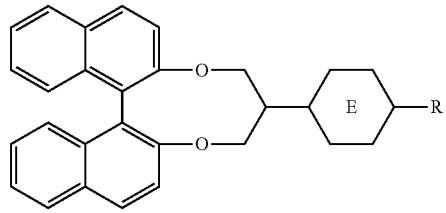

C-I

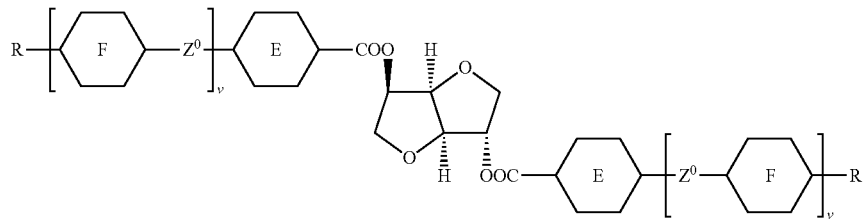

C-II

C-III

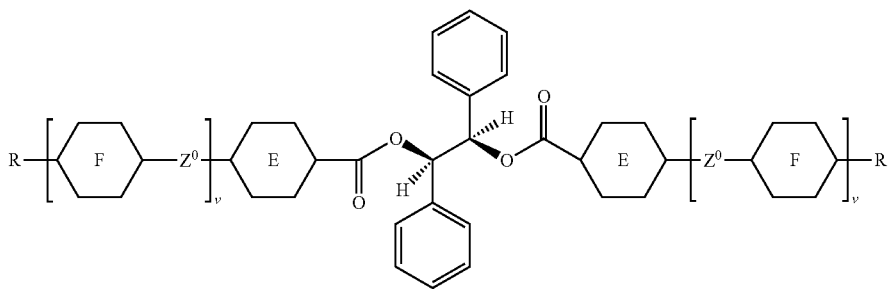

the latter ones including the respective (S,S) enantiomers,
wherein E and F are each independently 1,4-phenylene or trans-1,4-cyclo-hexylene, v is 0 or 1, $Z^0$ is —COO—, —COO—, —CH$_2$CH$_2$— or a single bond, and R is alkyl, alkoxy or alkanoyl with 1 to 12 C atoms.

Particularly preferred media according to the invention comprise at least one or more chiral dopants which themselves do not necessarily have to show a liquid crystalline phase and give good uniform alignment themselves.

The compounds of formula C-II and their synthesis are described in WO 98/00428. Especially preferred is the compound CD-1, as shown in table D below. The compounds of formula C—III and their synthesis are described in GB 2 328 207.

Especially preferred are chiral dopants with a high helical twisting power (HTP), in particular those disclosed in WO 98/00428.

Further, typically used chiral dopants are e.g. the commercially available R/S-5011, CD-1, R/S-811 and CB-15 (from Merck KGaA, Darmstadt, Germany).

The above mentioned chiral compounds R/S-5011 and CD-1 and the (other) compounds of formulae C-I, C-II and C-III exhibit a very high helical twisting power (HTP), and are therefore particularly useful for the purpose of the present invention.

The liquid crystalline medium preferably comprises preferably 1 to 5, in particular 1 to 3, very preferably 1 or 2 chiral dopants, preferably selected from the above formula C-II, in particular CD-1, and/or formula C-III and/or R-5011 or S-5011, very preferably, the chiral compound is R-5011, S-5011 or CD-1.

The amount of chiral compounds in the liquid crystalline medium is preferably from 1 to 20%, more preferably from 1 to 15%, even more preferably 1 to 10%, and most preferably 1 to 5%, by weight of the total mixture.

The liquid crystal media according to the present invention may contain further additives like for example stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles in usual concentrations. The total concentration of these further constituents is in the range of 0.1% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host medium are specified. The concentration of the respective additives is always given relative to the final doped mixture.

The liquid crystal media according to the present invention consists of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so-called pre-mixtures, which can be e.g. homologous or eutectic mixtures of compounds or using so-called multi-bottle-systems, the constituents of which are ready to use mixtures themselves.

Particularly preferred mixture concepts are indicated below: (the acronyms used are explained in Table A).

The mixtures according to the invention preferably comprise
  one or more compounds of formula I, preferably selected from the group of compounds of formulae Ia to Ic, preferably compounds wherein no group Sp is present, such as the compounds of formulae Ia-1 to Ia-5, Ia-10, Ic-1 to Ic-5 and Ic-10, and in particular the compounds of formulae Ic-3, Ic-4, Ic-5 and Ic-6, most preferably the compounds of formula Ic-3,
  preferably, the total concentration of compounds of formula I range from approximately 0.01 to approximately 10% by weight, preferably from approximately 0.01 to approximately 5% by weight, and more preferably from approximately 0.01 to approximately 3% by weight, based on the mixture as a whole,
  one or more compounds, preferably two, three, four, five or more compounds selected from the group of formulae A-I to A-III, preferably
    one, two, three or more compounds of formula A-I and one or more compounds of formula A-II, or
    one, two, three or more compounds of formula A-I and one or more compounds of formula A-III, or
    one, two, three or more compounds of formula A-II and one or more compounds of formula A-III, or,
    most preferred, one, two, three or more compounds of formula A-I and one or more compounds of formula A-II and one, two, three or more compounds of formula A-III,
  preferably in a total concentration of 95% or less, more preferably in the range from 50 to 95%, more preferably from 60 to 95%, and most preferably from 70 to 90% by weight of the total mixture, preferably these compounds are selected from
one or more compounds of formula A-I (i.e. ether-linked dimers), preferably in a concentration of 40% or less, more preferably of 30% or less, based on component A, particularly preferred one or more compounds of formula A-I-1 to A-I-3, preferably in concentration >5%, in particular from 10 to 30%, based on the mixture as a whole,
and/or
one or more compounds of formula A-II (i.e. methylene-linked dimers), preferably in a concentration of 40% or less, more preferably of 20% or less, particularly preferred one or more compounds of formula A-II-1 to A-II-4, and especially preferred selected from the group of formulae A-II-1, preferably in concentrations of 5% or more, in particular of 5 to 10% based on the mixture as a whole,
and/or
one or more compounds of formula A-III (e.g. ester-linked dimers), preferably in a concentration of 90% or less, more preferably of 80% or less, particularly preferred one or more compounds of formula A-III-1 to A-III-11, and especially preferred selected from the group of formulae A-III-5, A-III-7, A-III-8 and A-III-11 preferably in concentrations of 5% or more, in particular of 10 to 30% per compound, based on the mixture as a whole,
one, two, three or more compounds selected from the group of formulae B-I to B-III, preferably
one or more compounds of formula B-I and one or more compounds of formula B-II, or
one or more compounds of formula B-I and one or more compounds of formula B-III, or
one or more compounds of formula B-II and one or more compounds of formula B-III, or
one or more compounds of formula B-I and one or more compounds of formula B-II and one or more compounds of formula B-III,
preferably in a total concentration of 40% or less, preferably in the range from 1 to 40%, more preferably from 3 to 25%, and most preferably from 5 to 15% by weight of the total mixture, preferably these compounds are selected from formulae B-I and/or B—II and/or B-III, and especially preferred selected from the group of formulae
PP-n-N, PPP-n-N, CC-n-V, CC-n-V1, CEPGI-n-m, PY-n-Om, CCY-n-Om, CPY-n-Om and PYP-n-(O)m, preferably PP-5-N and/or PPP-3-N and/or CC-3-V and/or CC-4-V and/or CC-5-V and/or CC-3-V1 and/or CC-4-V1 and/or CEPGI-3-2 and/or CEPGI-5-2 and/or PY-3-O4, preferably in concentrations of 0.1% or more, in particular in the range from 0.1 to 10% per compound, based on the mixture as a whole,
and
one or more chiral compounds preferably in a total concentration in the range from 0.1 to 20%, in particular from 0.5 to 10%, very preferably 1 to 5% by weight of the total mixture, preferably these compounds are selected from formulae C-I, C-II, and C-III, in particular R-5011 or S-5011 or CD-1, especially preferred they comprise
R-5011, S-5011 or CD-1, preferably in a concentration of 1% or more based on the mixture as a whole particularly preferred
between 1 and 3%, in particular between 1 and 2%, of R-5011 or S-5011, or another chiral material in a concentration leading to the same cholesteric pitch as R-5011 or S-5011 in the preferred concentrations mentioned.

Further preferred conditions for the mesogenic media are the following. They are fulfilled independently from one another and from the conditions mentioned above. Preferably, however, two, three four or more of these conditions and of the conditions mentioned above are fulfilled simultaneously.

A further, especially preferred condition is that the mixture has a low absolute value of $\Delta\in$, but preferably is dielectrically positive, especially at the temperatures between T(N,I) and 0.8 T(N,I). Preferably $\Delta\in$ preferably is dielectrically positive at the temperatures from T(N,I) to the temperatures at which the ULH texture is still stable, preferably at least down to 40° C. Preferably, the value of $\Delta\in$ at these temperatures is 3 or less, more preferably in the range from 0 or more to 2 or less. In this respect it is not very important, if the value of $\Delta\in$ becomes negative at lower temperatures, then it preferably is the in the range from between −1 or more to 0 or less.

The liquid crystalline media according to the present invention can be used in liquid crystal displays, such as STN, TN, AMD-TN, temperature compensation, guest-host, phase change or surface stabilized or polymer stabilized cholesteric texture (SSCT, PSCT) displays, in particular in flexoelectric devices, in active and passive optical elements like polarizers, compensators, reflectors, alignment layers, color filters or holographic elements, in adhesives, synthetic resins with anisotropic mechanical properties, cosmetics, diagnostics, liquid crystal pigments, for decorative and security applications, in nonlinear optics, optical information storage or as chiral dopants.

The liquid crystalline media according to the present invention are particularly useful for flexoelectric liquid crystal display. Thus, another object of the present invention is a flexoelectric display comprising a liquid crystal medium according to the present invention.

The inventive mesogenic mixtures can be aligned in their cholesteric phase into different states of orientation by methods that are known to the expert, such as surface treatment or electric fields. For example, they can be aligned into the planar (Grandjean) state, into the focal conic state or into the homeotropic state. Inventive compounds of formula I comprising polar groups with a strong dipole moment can further be subjected to flexoelectric switching, and can thus be used in electro optical switches or liquid crystal displays.

The switching between different states of orientation according to a preferred embodiment of the present invention is exemplarily described below in detail for a sample of an inventive mixture.

The total concentration of all compounds in the media according to this application is 100%.

According to this preferred embodiment, the sample is placed into a cell comprising two plane-parallel glass plates coated with electrode layers, e.g. ITO layers, and aligned in its cholesteric phase into a planar state wherein the axis of the cholesteric helix is oriented normal to the cell walls. This state is also known as Grandjean state, and the texture of the sample, which is observable e.g. in a polarization microscope, as Grandjean texture. Planar alignment can be achieved e.g. by surface treatment of the cell walls, for example by rubbing and/or coating with an alignment layer such as polyimide.

A Grandjean state with a high quality of alignment and only few defects can further be achieved by heating the sample to the isotropic phase, subsequently cooling to the chiral nematic phase at a temperature close to the chiral nematic-isotropic phase transition, and rubbing the cell.

In the planar state, the sample shows selective reflection of incident light, with the central wavelength of reflection depending on the helical pitch and the mean refractive index of the material.

When an electric field is applied to the electrodes, for example with a frequency from 10 Hz to 1 kHz, and an amplitude of up to 12 $V_{rms}/\mu m$, the sample is being switched into a homeotropic state where the helix is unwound and the molecules are oriented parallel to the field, i.e. normal to the plane of the electrodes. In the homeotropic state, the sample is transmissive when viewed in normal daylight, and appears black when being put between crossed polarizers.

Upon reduction or removal of the electric field in the homeotropic state, the sample adopts a focal conic texture, where the molecules exhibit a helically twisted structure with the helical axis being oriented perpendicular to the field, i.e. parallel to the plane of the electrodes. A focal conic state can also be achieved by applying only a weak electric field to a sample in its planar state. In the focal conic state, the sample is scattering when viewed in normal daylight and appears bright between crossed polarizers.

The sample in the different states of orientation exhibits different transmission of light. Therefore, the respective state of orientation, as well as its quality of alignment, can be controlled by measuring the light transmission of the sample depending on the strength of the applied electric field. Thereby it is also possible to determine the electric field strength required to achieve specific states of orientation and transitions between these different states.

In the sample, the above-described focal conic state consists of many disordered birefringent small domains. By applying an electric field greater than the field for nucleation of the focal conic texture, preferably with additional shearing of the cell, a uniformly aligned texture is achieved where the helical axis is parallel to the plane of the electrodes in large, well-aligned areas. In accordance with the literature on state of the art chiral nematic materials, such as P. Rudquist et al., Liq. Cryst. 23 (4), 503 (1997), this texture is also called uniformly lying helix (ULH) texture. This texture is required to characterize the flexoelectric properties of the inventive compound.

The sequence of textures typically observed in a sample on a rubbed polyimide substrate upon increasing or decreasing electric field is given below:

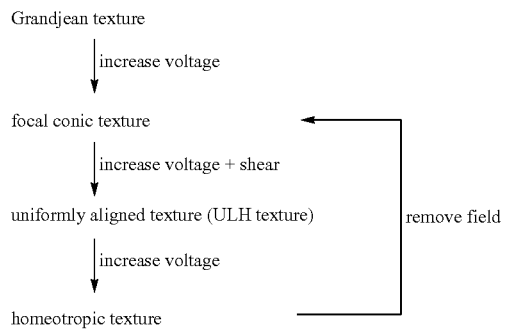

Starting from the ULH texture, the inventive mesogenic media can be subjected to flexoelectric switching by application of an electric field. This causes rotation of the optic axis of the material in the plane of the cell substrates, which leads to a change in transmission when placing the material between crossed polarizers. The flexoelectric switching of inventive materials is further described in detail in the introduction above and in the examples.

It is also possible to obtain the ULH texture, starting from the focal conic texture, by applying an electric field with a high frequency, of for example 10 kHz, to the sample whilst cooling slowly from the isotropic phase into the cholesteric phase and shearing the cell. The field frequency may differ for different compounds.

The bimesogenic compounds of formula A-I to A-III are particularly useful in flexoelectric liquid crystal displays as they can easily be aligned into macroscopically uniform orientation, and lead to high values of the elastic constant $k_{11}$ and a high flexoelectric coefficient e in the liquid crystal medium according to the present invention.

The liquid crystal medium preferably exhibits a $k_{11} < 1 \times 10^{-10}$ N, preferably $< 2 \times 10^{-11}$ N and an average flexoelectric coefficient $e > 1 \times 10^{-11}$ C/m, preferably $> 1 \times 10^{-10}$ C/m.

Apart from the use in flexoelectric devices, the inventive media are also suitable for other types of displays and other optical and electro-optical applications, such as optical compensation or polarizing films, color filters, reflective cholesterics, optical rotatory power and optical information storage.

A further aspect of the present invention relates to a display cell wherein the cell walls exhibit hybrid alignment conditions. The term "hybrid alignment" or orientation of a liquid crystal or mesogenic material in a display cell or between two substrates means that the mesogenic groups adjacent to the first cell wall or on the first substrate exhibit homeotropic orientation and the mesogenic groups adjacent to the second cell wall or on the second substrate exhibit planar orientation.

A flexoelectric display according to a preferred embodiment of the present invention comprises two plane parallel substrates, preferably glass plates covered with a transparent conductive layer such as indium tin oxide (ITO) on their inner surfaces, and a flexoelectric liquid crystalline medium provided between the substrates, characterized in that one of the inner substrate surfaces exhibits homeotropic alignment conditions and the opposite inner substrate surface exhibits planar alignment conditions for the liquid crystalline medium.

Planar alignment can be achieved e.g. by means of an alignment layer, for example a layer of rubbed polyimide or sputtered $SiO_x$, that is applied on top of the substrate.

Alternatively, it is possible to directly rub the substrate, i.e. without applying an additional alignment layer. For example, rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Homeotropic alignment can be achieved e.g. by means of an alignment layer coated on top of the substrate. Suitable aligning agents used on glass substrates are for example alkyltrichlorosilane or lecithine, whereas for plastic substrate thin layers of lecithin, silica or high tilt polyimide orientation films as aligning agents may be used. In a preferred embodiment of the invention silica coated plastic film is used as a substrate.

Further suitable methods to achieve planar or homeotropic alignment are described for example in J. Cognard, Mol. Cryst. Liq. Cryst. 78, Supplement 1, 1-77 (1981).

By using a display cell with hybrid alignment conditions, a very high switching angle of flexoelectric switching, fast response times and a good contrast can be achieved.

The flexoelectric display according to present invention may also comprise plastic substrates instead of glass substrates. Plastic film substrates are particularly suitable for rubbing treatment by rubbing rollers as described above.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

Unless the context clearly indicates otherwise, as used herein plural forms of the terms herein are to be construed as including the singular form and vice versa.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz or if explicitly stated at a frequency 19 GHz. The threshold voltages, as well as all other electro-optical properties, are determined using test cells produced at Merck KGaA, Germany. The test cells for the determination of $\Delta\epsilon$ have a cell thickness of approximately 20 µm. The electrode is a circular ITO electrode having an area of 1.13 cm$^2$ and a guard ring. The orientation layers are SE-1211 from Nissan Chemicals, Japan, for homeotropic orientation ($\epsilon\|$) and polyimide AL-1054 from Japan Synthetic Rubber, Japan, for homogeneous orientation ($\epsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that many of the features described above, particularly of the preferred embodiments, are inventive in their own right and not just as part of an embodiment of the present invention. Independent protection may be sought for these features in addition to, or alternative to any invention presently claimed.

Throughout the present application it is to be understood that the angles of the bonds at a C atom being bound to three adjacent atoms, e.g. in a C=C or C=O double bond or e.g. in a benzene ring, are 120° and that the angles of the bonds at a C atom being bound to two adjacent atoms, e.g. in a C≡C or in a C≡N triple bond or in an allylic position C=C=C are 180°, unless these angles are otherwise restricted, e.g. like being part of small rings, like 3-, 5- or 5-atomic rings, notwithstanding that in some instances in some structural formulae these angles are not represented exactly.

It will be appreciated that variations to the foregoing embodiments of the invention can be made while still falling within the scope of the invention. Alternative features serving the same, equivalent or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

In the foregoing and in the following examples, unless otherwise indicated, all temperatures are set forth uncorrected in degrees Celsius and all parts and percentages are by weight.

The following abbreviations are used to illustrate the liquid crystalline phase behavior of the compounds: K=crystalline; N=nematic; N2=second nematic; S=smectic; Ch=cholesteric; I=isotropic; Tg=glass transition. The numbers between the symbols indicate the phase transition temperatures in ° C.

In the present application and especially in the following examples, the structures of the liquid crystal compounds are represented by abbreviations, which are also called "acronyms". The transformation of the abbreviations into the corresponding structures is straightforward according to the following three tables A to C.

All groups $C_nH_{2n+1}$, $C_mH_{2m+1}$, and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH=CH— preferably is trans-respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

Ring Elements

C 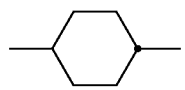 P 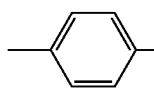

TABLE A-continued
Ring Elements
| | | | |
|---|---|---|---|
| D | 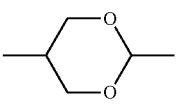 | DI | 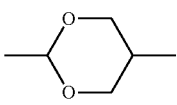 |
| A | 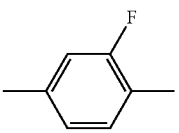 | AI | 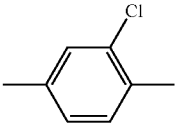 |
| G | 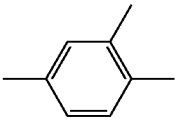 | GI | 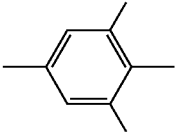 |
| G(Cl) | 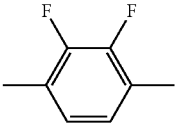 | GI(Cl) | 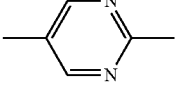 |
| G(1) | 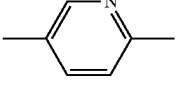 | GI(1) | 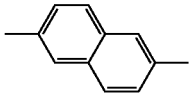 |
| U | 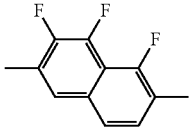 | UI | 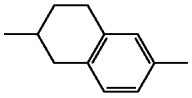 |
| Y | 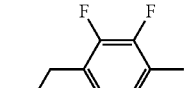 | | |
| M | 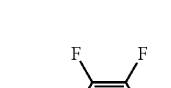 | MI | 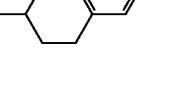 |
| N | 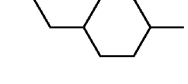 | NI | 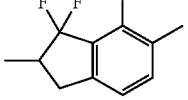 |
| np | 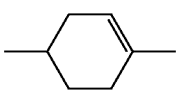 | | |
| n3f | 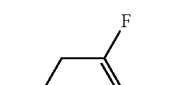 | n3fI |  |
TABLE A-continued
Ring Elements
| | | | |
|---|---|---|---|
| th | | thI | |
| th2f | | th2fI | |
| o2f | | o2fI | |
| dh | | | |
| K | | KI | |
| L | | LI | |
| F | | FI | |
TABLE B
Linking Groups
| | | | |
|---|---|---|---|
| n | $(-CH_2-)_n$ | "n" is an integer except 0 and 2 | |
| E | $-CH_2-CH_2-$ | | |
| V | $-CH=CH-$ | | |
| T | $-C\equiv C-$ | | |
| W | $-CF_2-CF_2-$ | | |
| B | $-CF=CF-$ | | |
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |
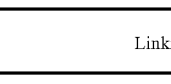

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and three points " . . . " indicate a space for other symbols of this table.

Preferably, the liquid crystalline media according to the present invention comprise, besides the compound(s) of formula I one or more compounds selected from the group of compounds of the formulae of the following table.

TABLE D

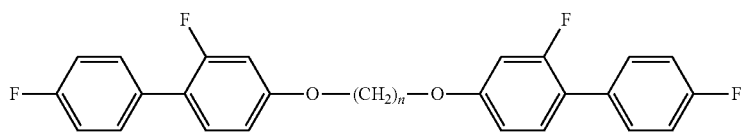

F-PGI-O-n-O-GP-F

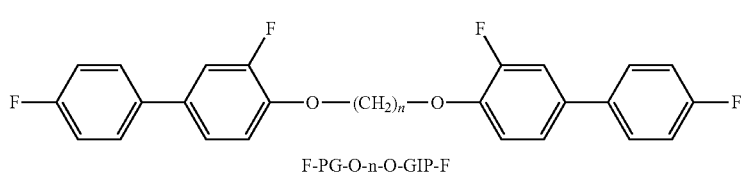

F-PG-O-n-O-GIP-F

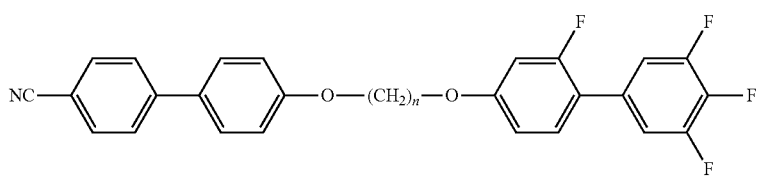

N-PP-O-n-O-GU-F

TABLE D-continued
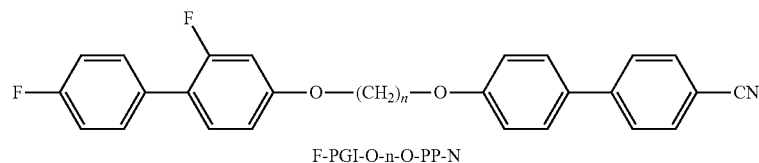
F-PGI-O-n-O-PP-N
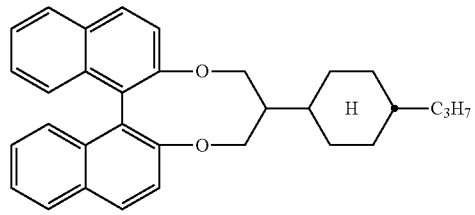
R-5011 respectively S-5011
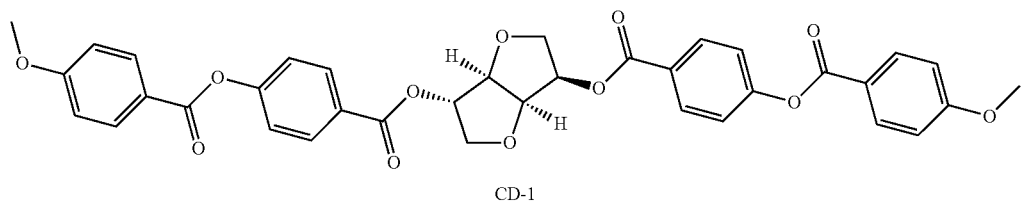
CD-1
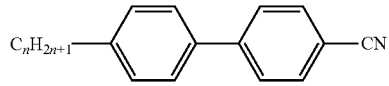
PP-n-N
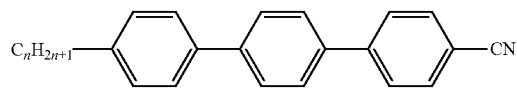
PPP-n-N
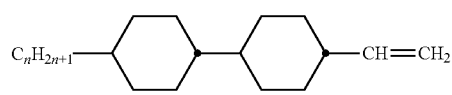
CC-n-V
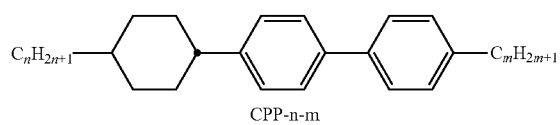
CPP-n-m
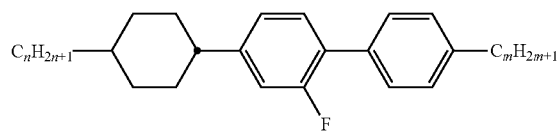
CGP-n-m
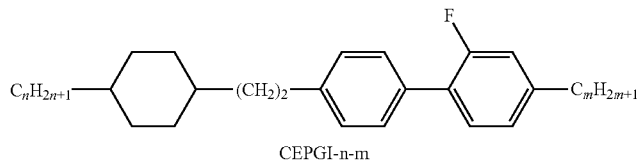
CEPGI-n-m TABLE D-continued
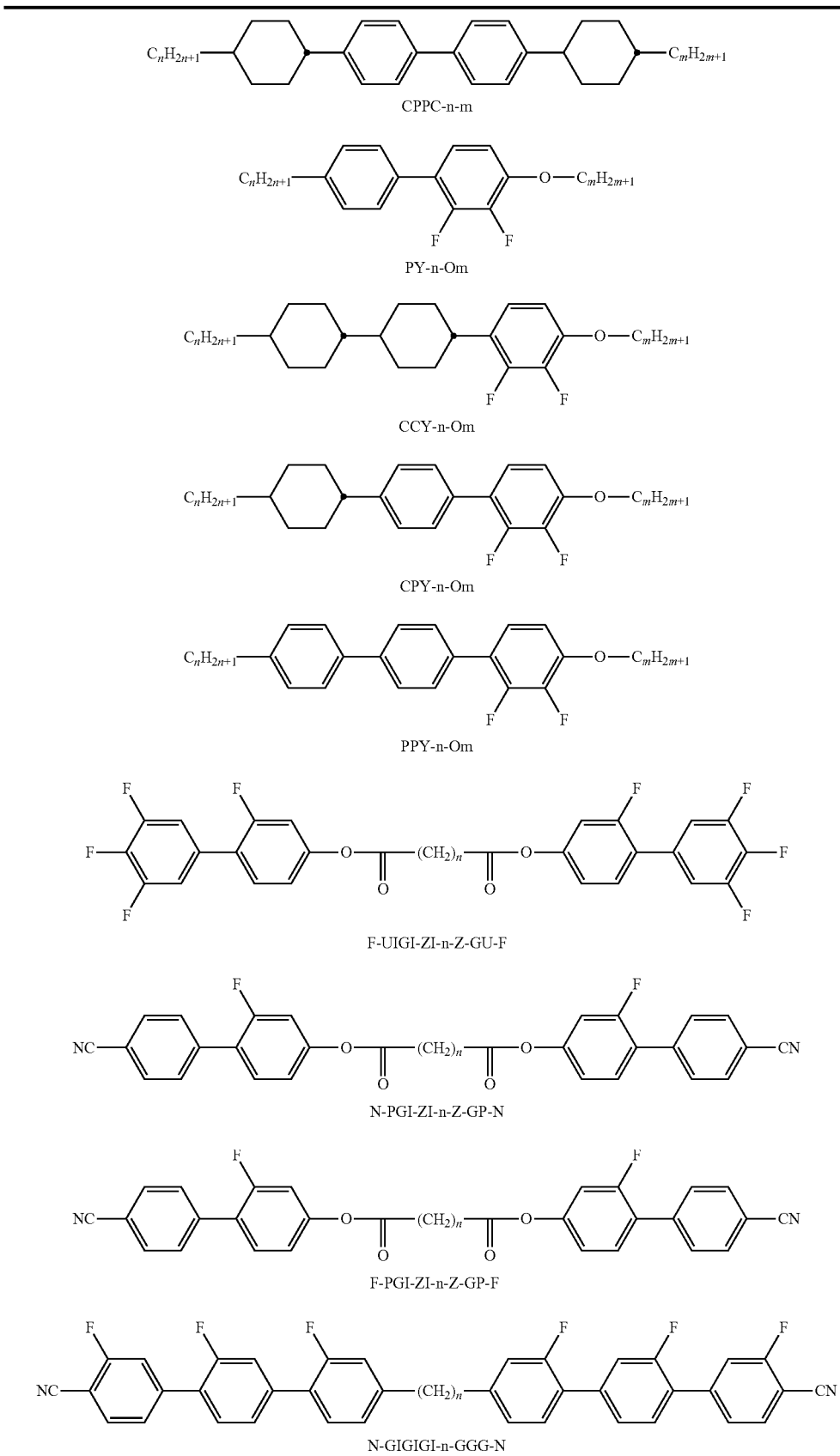

TABLE D-continued
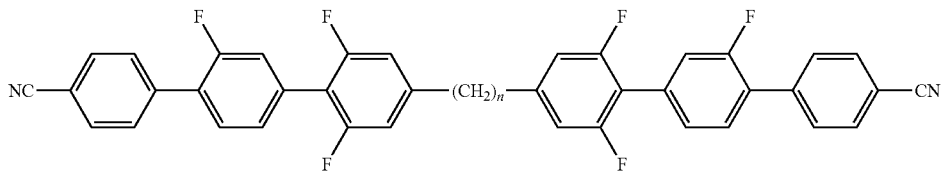
N-PGIUI-n-UGP-N
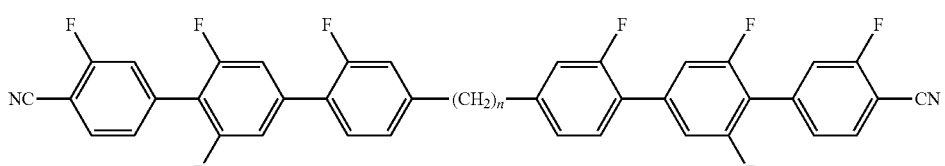
N-GIUIGI-n-GUG-N
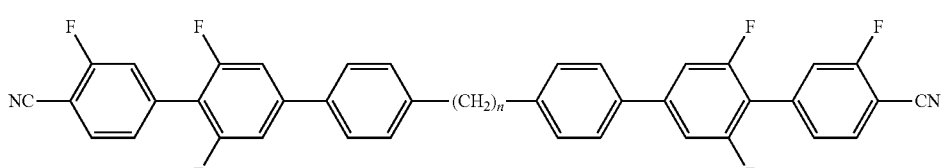
N-GIUIP-n-PUG-N
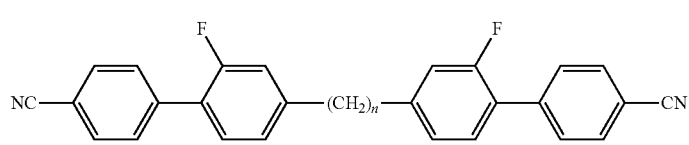
N-PGI-n-GP-N
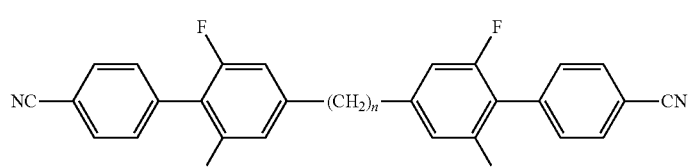
N-PUI-n-UP-N
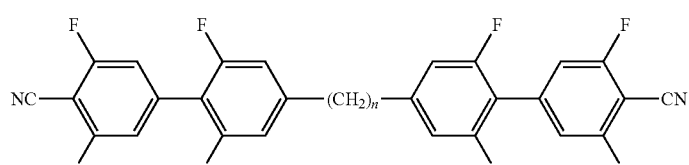
N-UIUI-n-UU-N
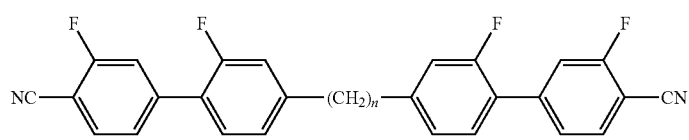
N-GIGI-n-GG-N
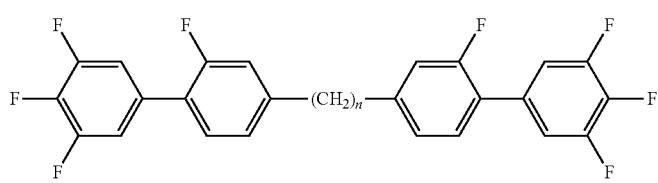
F-UIGI-n-GU-F TABLE D-continued
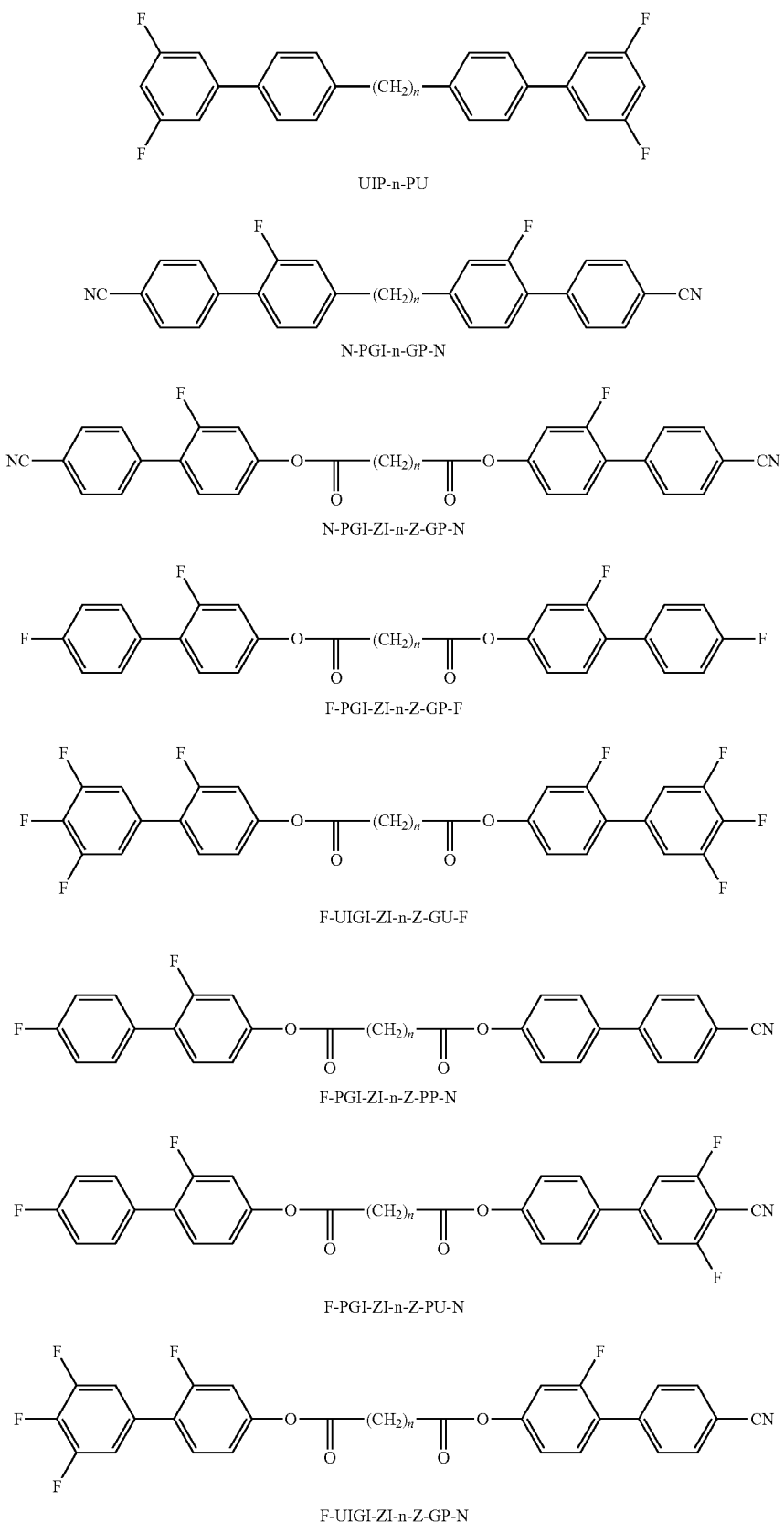

TABLE D-continued
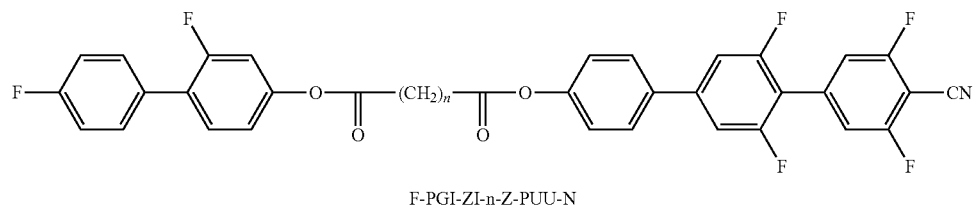
F-PGI-ZI-n-Z-PUU-N
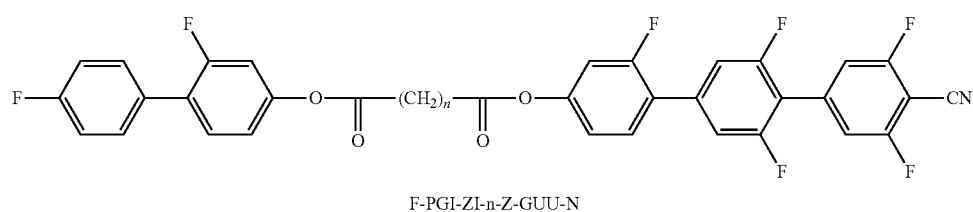
F-PGI-ZI-n-Z-GUU-N
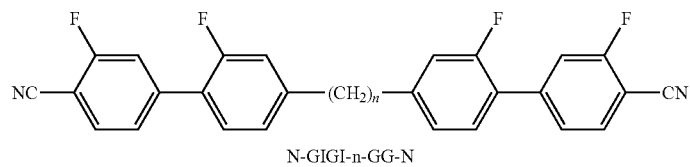
N-GIGI-n-GG-N
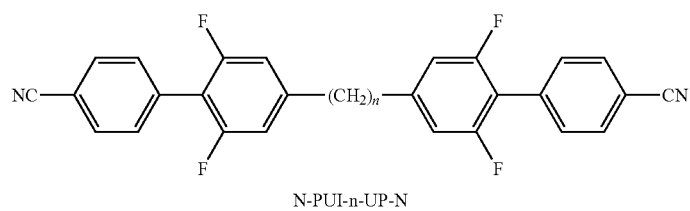
N-PUI-n-UP-N
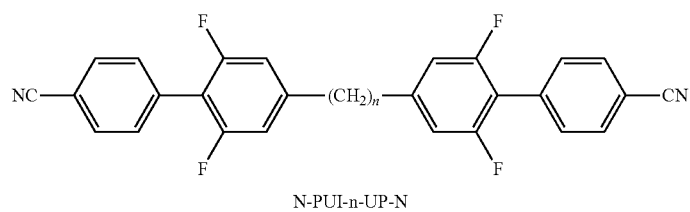
N-PUI-n-UP-N
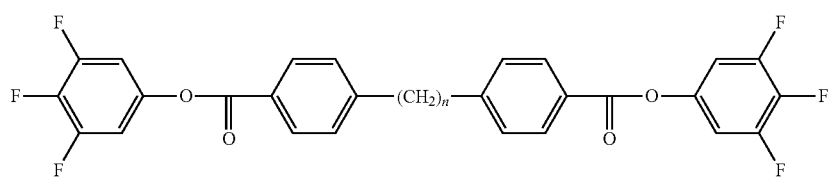
F-UZIP-n-PZU-F
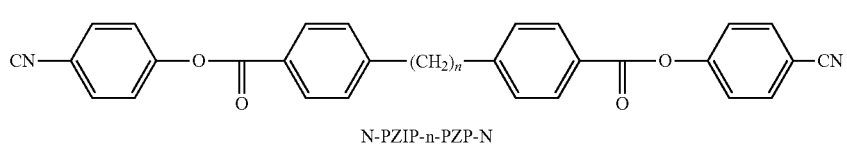
N-PZIP-n-PZP-N

EXAMPLES

The measurement cells have soda-lime glass substrates and are constructed with polyimide alignment layers (AL-3046 from Japan Synthetic Rubber, Japan) with a layer thickness of 50 nm, which have been rubbed perpendicularly to one another. The layer thickness is a uniform 3.0 μm. The surface area of the transparent ITO electrodes is 1 cm². Cells were filled vertically on a hot plate in the isotropic phase. In order to obtain ULH alignment the cells were cooled from 100° C. to 85° C. at 3° C./min under an applied electric field of $12V_{pk\text{-}pk}$ at 30 Hz.

Comparative Example 1

The following mixture CM-1 is prepared:

| Compound | wt. % |
|---|---|
| R5011 | 1.7 |
| F-PGI-ZI-7-Z-PP-N | 23.8 |
| F-PGI-ZI-9-Z-PU-N | 15.5 |
| F-PGI-ZI-9-Z-PUU-N | 13.7 |
| F-UIGI-ZI-9-Z-GP-N | 25.8 |
| N-PZIP-7-PZP-N | 7.6 |
| CGP-32 | 1.6 |
| CPPC -33 | 0.5 |
| CC-3-V | 3.5 |
| CCY-3-O2 | 0.4 |
| CCY-4-O2 | 1.6 |
| CPY-2-O2 | 1.3 |
| CPY-3-O2 | 1.3 |
| PY-3-O2 | 1.7 |

Example 1

To the mixture CM-1 the compound SA-1 is added in an amount of 2 wt. % resulting in mixture M-1:

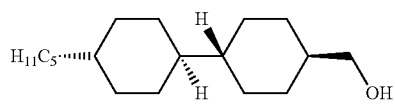

SA 1

The mixture M-1 shows in comparison to the mixture CM-1 without SA-1 improved textures in the test cells.

Furthermore, in comparison to CM-1 the amount of alignment defects observed in the test cells is drastically reduced and the dark state is significantly improved.

In summary, SA-1 has a positive effect on the alignment of ULH-mixtures and results in a higher quality dark state in the corresponding test cells.

The invention claimed is:

1. Medium comprising one or more bimesogenic compounds, one or more nematogenic compound, one or more chiral compound and one or more compounds of formula I,

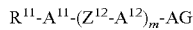

R¹¹-A¹¹-(Z¹²-A¹²)ₘ-AG     I in which,
A¹¹ and A¹² each, independently of one another, denote an aryl-, heteroaryl-, heterocyclic- or alicyclic group optionally being substituted by one or more identical or different groups L,
L in each case, independently of one another, denotes, halogen, —CN, —NO₂, —NCO, —NCS, —OCN, —SCN, straight-chain or branched alkyl or alkoxy having 1 to 5 C atoms, where, in addition, one or more non-terminal CH₂ groups in these radicals may each be replaced, independently of one another, by —C≡C—, —CF₂O—, —CH=CH—,

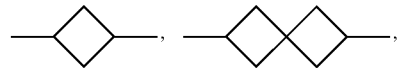

—O—, —CO—O—, —O—CO— in such a way that O atoms are not linked directly to one another, and in which, in addition, one or more H atoms may be replaced by halogen,
Z¹² in each case, independently of one another, denotes —O—, —S—, —CO—, —COO—, —OCO—, —S—CO—, —CO—S—, —O—COO—, —CO—NR⁰—, —NR⁰-CO—, —NR⁰-CO—NR⁰⁰, —NR⁰-CO—O—, —O—CO—NR⁰—, —OCH₂—, —CH₂O—, —SCH₂—, —CH₂S—, —CF₂O—, —OCF₂—, —CF₂S—, —SCF₂—, —CH₂CH₂—, —(CH₂)₄—, —CF₂CH₂—, —CH₂CF₂—, —CF₂CF₂—, —CH=N—, —N=CH—, —N=N—, —CH=CR⁰—, —CY⁰¹=CY⁰²—, —C≡C—, —CH=CH—COO—, —OCO—CH=CH—, or a single bond,
Y⁰¹ and Y⁰² each, independently of one another, denote H, F, Cl or CN,
R⁰ and R⁰⁰ each, independently of one another, denote H or alkyl having 1 to 12 C atoms,
R¹¹ denotes an alkyl or alkoxy radical having 1 to 15 C atoms, where, in addition, one or more non-terminal CH₂ groups in these radicals may each be replaced, independently of one another, by —C≡C—, —CF₂O—, —CH=CH—,

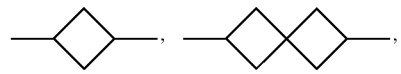

—O—, —CO—O—, —O—CO— in such a way that O atoms are not linked directly to one another, and in which, in addition, one or more H atoms may be replaced by halogen,
AG denotes -Sp-X¹¹,
Sp denotes —(CH₂)ₚ—,
p denotes 0, 1 or 2,
X¹¹ denotes a group —NH₂, —SH, —OH, —(CO)OH or a group of the formulae

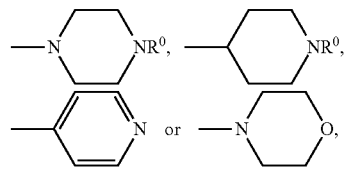

and
m denotes 0, 1 or 2;
wherein:
the one or more bimesogenic compound is selected from the group of compounds of formulae A-I to A-III,

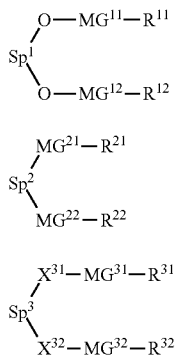 A-I

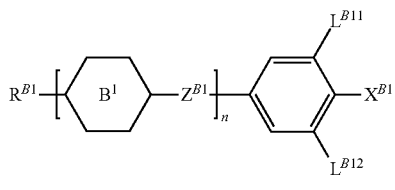 B-I

A-II

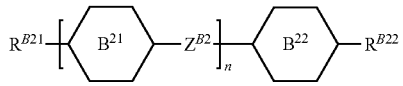 B-II

A-III

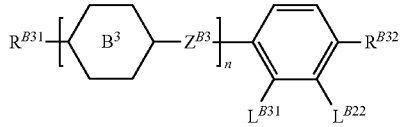 B-III wherein $R^{11}$ and $R^{12}$, $R^{21}$ and $R^{22}$, and $R^{31}$ and $R^{32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent CH$_2$ groups to be replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, MG$^{11}$ and MG$^{12}$, MG$^{21}$ and MG$^{22}$, and MG$^{31}$ and MG$^{32}$ are each independently a mesogenic group, Sp$^1$, Sp$^2$ and Sp$^3$ are each independently a spacer group comprising 5 to 40 C atoms, wherein one or more non-adjacent CH$_2$ groups, with the exception of the CH$_2$ groups of Sp$^1$ linked to O-MG$^{11}$ and/or O-MG$^{12}$, of Sp$^2$ linked to MG$^{21}$ and/or MG$^{22}$ and of Sp$^3$ linked to X$^{31}$ and X$^{32}$, may also be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—, in such a way that no two O-atoms are adjacent to one another, no two —CH=CH— groups are adjacent to each other, and no two groups selected from —O—CO—, —S—CO—, —O—COO—, —CO—S—, —CO—O— and —CH=CH— are adjacent to each other, and X$^{31}$ and X$^{32}$ are independently from one another a linking group selected from —CO—O—, —O—CO—, —CH=CH—, —C≡C— or —S—, and, alternatively, one of them may also be either —O— or a single bond, and, again alternatively, one of them may be —O— and the other one a single bond;

the one or more nematogenic compound is selected from the group of compounds of formulae B-I to B-III, wherein $R^{B1}$, $R^{B21}$, $R^{B22}$, $R^{B31}$ and $R^{B32}$ are each independently H, F, Cl, CN, NCS or a straight-chain or branched alkyl group with 1 to 25 C atoms which may be unsubstituted, mono- or polysubstituted by halogen or CN, it being also possible for one or more non-adjacent CH$_2$ groups to be replaced, in each occurrence independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF— or —C≡C— in such a manner that oxygen atoms are not linked directly to one another, $X^{B1}$ is F, Cl, CN, NCS, $Z^{B1}$, $Z^{B2}$ and $Z^{B3}$ are in each occurrence independently —CH$_2$—CH$_2$—, —CO—O—, —O—CO—, —CF$_2$-O—, —O—CF$_2$—, —CH=CH— or a single bond,

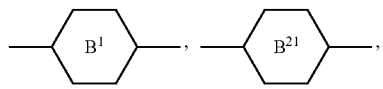

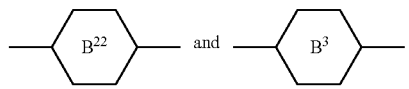 are in each occurrence independently

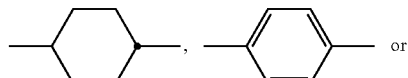 or

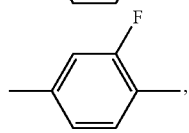, alternatively one or more of

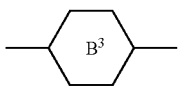

are

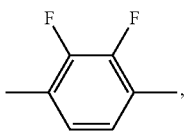

and
n is 1, 2 or 3; and
the one or more chiral compound is selected from the group of compounds of formulae C-I to C-III,

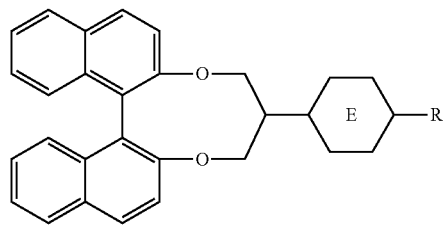

C-I

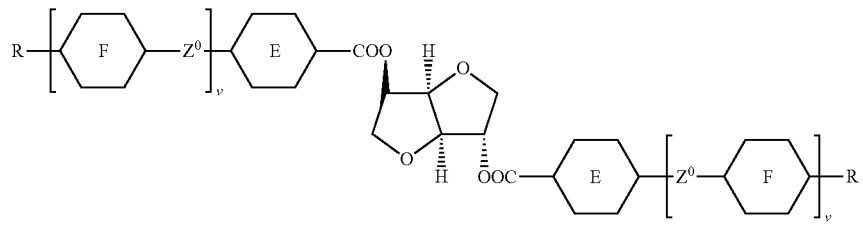

C-II

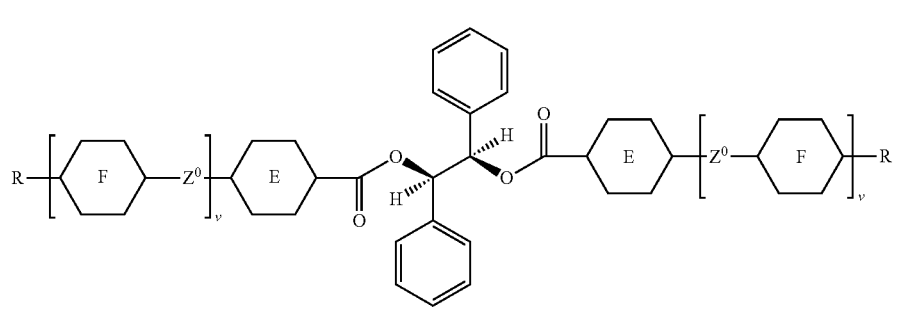

C-III the latter ones including the respective (S,S) enantiomers, and wherein
E and F are each independently 1,4-phenylene or trans-1,4-cyclohexylene,
v is 0 or 1,
$Z^0$ is —COO—, —OCO—, —CH$_2$CH$_2$— or a single bond, and
R is alkyl, alkoxy or alkanoyl with 1 to 12 C atoms.
2. Medium according to claim 1, characterized in that the compounds of formula I are selected from the group of compounds wherein the anchor group AG in formula I denotes —NH$_2$, —SH, —OH or —(CO)OH.

3. Medium according to claim 1, characterized in that the compounds of formula I are selected from the group of compounds of the following sub formulae, $R^{11}$-$A^{11}$-($Z^{12}$-$A^{12}$)$_m$-Sp-NH$_2$   Ia $R^{11}$-$A^{11}$-($Z^{12}$-$A^{12}$)$_m$Sp-SH   Ib $R^{11}$-$A^{11}$-($Z^{12}$-$A^{12}$)$_m$Sp-OH   Ic $R^{11}$-$A^{11}$-($Z^{12}$-$A^{12}$)$_m$Sp-(CO)OH   Id in which, the groups $R^{11}$, $A^{11}$, $A^{12}$, $Z^{12}$, Sp and parameter m have one of the meanings as indicated in claim 1.

4. Medium according to claim 1, characterized in that the compounds of formula I are selected from the following sub formulae,

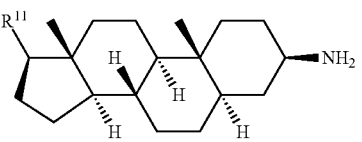

Ia-1

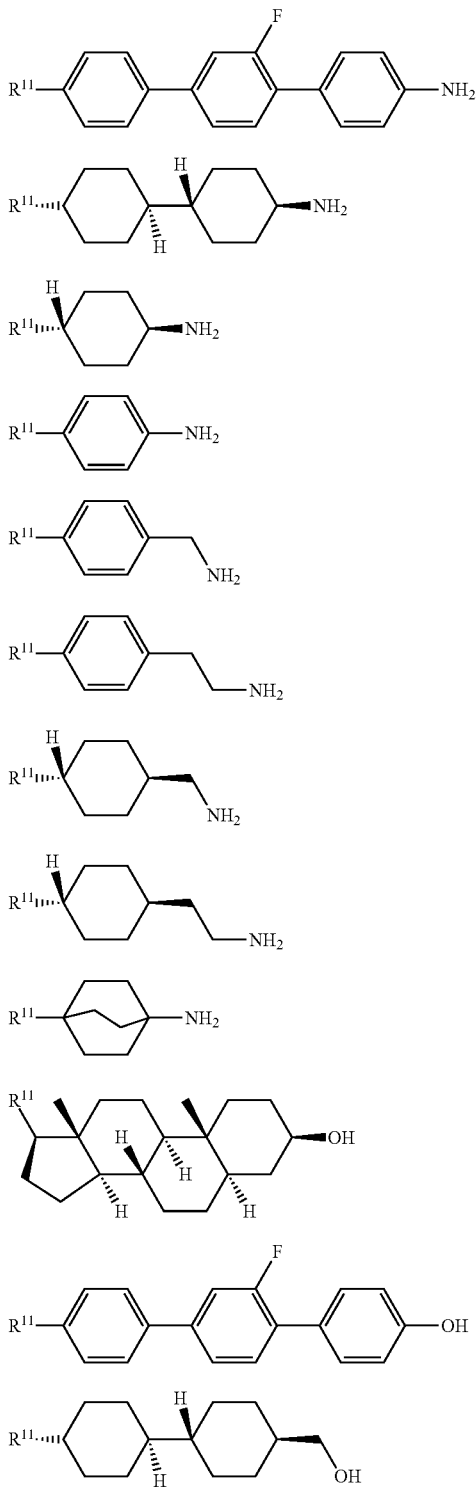
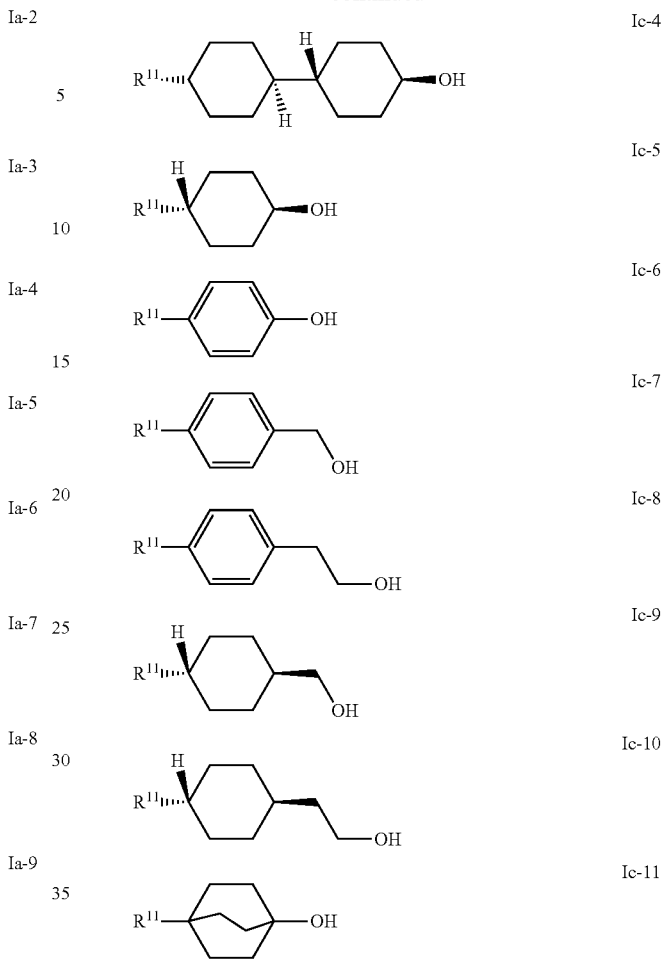

in which $R^{11}$ is a straight chain or branched alkyl, having 1 to 25 C atoms.

5. Medium according to claim 1, characterized in that the total concentration of compounds of formula I in the medium is from 0.01 to 10% by weight.

6. Medium according to claim 1, characterized in that the amount of chiral compounds in the medium is from 1 to 20% by weight.

7. Electro-optical device comprising a medium according to claim 1.

8. Electro-optical device according to claim 7, characterized in that it is a flexoelectric device.

9. Electro-optical device according to claim 7, characterized in that it comprises two plane parallel electrodes the inner surfaces of which exhibit planar, anti-parallel alignment conditions.

\* \* \* \* \*